United States Patent
Saruta et al.

(10) Patent No.: US 10,012,741 B2
(45) Date of Patent: Jul. 3, 2018

(54) RADIATION DETECTION APPARATUS AND RADIATION IMAGING SYSTEM

(71) Applicant: CANON KABUSHIKI KAISHA, Tokyo (JP)

(72) Inventors: Shoshiro Saruta, Tokyo (JP); Keiichi Nomura, Kawasaki (JP); Kazumi Nagano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/461,754

(22) Filed: Mar. 17, 2017

(65) Prior Publication Data
US 2017/0276805 A1    Sep. 28, 2017

(30) Foreign Application Priority Data

Mar. 28, 2016  (JP) .................................. 2016-064395
Oct. 28, 2016  (JP) .................................. 2016-212126

(51) Int. Cl.
*G01T 1/20*    (2006.01)
*G01T 1/202*   (2006.01)

(52) U.S. Cl.
CPC .............. *G01T 1/2002* (2013.01); *G01T 1/20* (2013.01); *G01T 1/2018* (2013.01); *G01T 1/2023* (2013.01)

(58) Field of Classification Search
CPC ....... G01T 1/2023; G01T 1/28; G01T 1/2935; G01T 1/185; G01T 1/247; G01T 1/1648; G01T 1/2018
USPC ....................................................... 250/366
See application file for complete search history.

(56) References Cited

U.S. PATENT DOCUMENTS

| | | | | |
|---|---|---|---|---|
| 5,376,801 A | * | 12/1994 | Saotome | ................... G03C 5/17 250/482.1 |
| 5,394,454 A | * | 2/1995 | Harding | ................... G21K 1/10 378/156 |
| 5,661,306 A | * | 8/1997 | Arakawa | ................ B82Y 10/00 250/484.4 |

(Continued)

FOREIGN PATENT DOCUMENTS

| | | |
|---|---|---|
| JP | 5-208000 A | 8/1993 |
| JP | 2000-298198 A | 10/2000 |

(Continued)

OTHER PUBLICATIONS

Extended European Search Report in European Application No. 17161014.0 (dated Aug. 2, 2017).

*Primary Examiner* — Taeho Jo
(74) *Attorney, Agent, or Firm* — Fitzpatrick, Cella, Harper & Scinto

(57) ABSTRACT

A radiation detection apparatus is provided. The apparatus comprises a housing, a first radiation imaging panel and a second radiation imaging panel arranged to overlap each other in the housing, and a radiation absorbing portion arranged between the first radiation imaging panel and the second radiation imaging panel. The radiation absorbing portion comprises a first member with energy at a K-absorption edge being not less than 38 keV and not more than 60 keV. The first member comprises a resin added with particles containing at least one element selected from the group consisting of lanthanum, cerium, praseodymium, neodymium, promethium, samarium, europium, gadolinium, terbium, dysprosium, holmium, erbium, and thulium.

34 Claims, 15 Drawing Sheets

(56) References Cited

U.S. PATENT DOCUMENTS

| | | | |
|---|---|---|---|
| 6,072,855 A * | 6/2000 | Arakawa | G01T 1/2012 250/582 |
| 6,392,237 B1 | 5/2002 | Agano | |
| 6,624,436 B1 * | 9/2003 | Kohda | C09K 11/7733 250/484.4 |
| 7,317,190 B2 * | 1/2008 | Ertel | G01T 1/2018 250/370.11 |
| 7,538,330 B2 | 5/2009 | Nomura et al. | |
| 7,714,294 B2 | 5/2010 | Sawada et al. | |
| 7,723,693 B2 | 5/2010 | Okada et al. | |
| 7,893,405 B2 | 2/2011 | Nomura et al. | |
| 8,115,177 B2 | 2/2012 | Takeda et al. | |
| 8,648,312 B2 | 2/2014 | Ichimura et al. | |
| 8,653,465 B2 | 2/2014 | Nagano et al. | |
| 8,686,361 B2 | 4/2014 | Nomura et al. | |
| 8,779,369 B2 | 7/2014 | Ichimura et al. | |
| 8,993,989 B1 * | 3/2015 | Khandkar | B32B 33/00 250/505.1 |
| 9,006,665 B2 | 4/2015 | Nagano et al. | |
| 9,052,400 B2 | 6/2015 | Saruta et al. | |
| 2002/0027201 A1 * | 3/2002 | Agano | G01V 5/0041 250/370.11 |
| 2005/0082491 A1 * | 4/2005 | Seppi | A61B 6/032 250/370.11 |
| 2007/0040125 A1 * | 2/2007 | Sato | H01L 27/14663 250/367 |
| 2007/0072112 A1 * | 3/2007 | Prokopowicz | G03F 7/091 430/270.1 |
| 2008/0011960 A1 * | 1/2008 | Yorkston | G01T 1/2018 250/370.09 |
| 2008/0142732 A1 * | 6/2008 | Kulpinski | G01T 1/2014 250/484.4 |
| 2009/0078891 A1 * | 3/2009 | Oyaizu | G21F 1/10 250/515.1 |
| 2011/0215250 A1 * | 9/2011 | Ohta | G01T 1/24 250/370.08 |
| 2012/0187298 A1 | 7/2012 | Sasaki et al. | |
| 2012/0205544 A1 * | 8/2012 | Nakatsugawa | G01T 1/242 250/367 |
| 2013/0153775 A1 | 6/2013 | Nomura et al. | |
| 2013/0168559 A1 | 7/2013 | Saruta et al. | |
| 2013/0292574 A1 * | 11/2013 | Levene | G01T 1/2018 250/362 |
| 2013/0308755 A1 | 11/2013 | Ishida et al. | |
| 2014/0284485 A1 | 9/2014 | Nagano et al. | |
| 2015/0014546 A1 | 1/2015 | Ichimura et al. | |
| 2015/0313811 A1 * | 11/2015 | Khandkar | A61K 9/0014 424/49 |
| 2016/0097865 A1 | 4/2016 | Sasaki et al. | |
| 2016/0322411 A1 * | 11/2016 | Elen | H01L 27/14623 |
| 2016/0322418 A1 * | 11/2016 | Leblans | G01T 1/2018 |

FOREIGN PATENT DOCUMENTS

| | | |
|---|---|---|
| JP | 2001-249182 A | 9/2001 |
| JP | 2011-000235 A | 1/2011 |
| JP | 2011-022132 A | 2/2011 |

* cited by examiner

FIG. 2

| ATOMIC NUMBER | ELEMENT SYMBOL | K-ABSORPTION EDGE (keV) |
|---|---|---|
| 57 | La | 38.92 |
| 58 | Ce | 40.44 |
| 59 | Pr | 41.99 |
| 60 | Nd | 43.57 |
| 61 | Pm | 45.18 |
| 62 | Sm | 46.83 |
| 63 | Eu | 48.52 |
| 64 | Gd | 50.24 |
| 65 | Tb | 52.00 |
| 66 | Dy | 53.79 |
| 67 | Ho | 55.62 |
| 68 | Er | 57.49 |
| 69 | Tm | 59.39 |
| 70 | Yb | 61.33 |
| 71 | Lu | 63.31 |

FIG. 9

| CALCULATED VALUE | | FIRST EXAMPLE | SECOND EXAMPLE | THIRD EXAMPLE | FIRST COMPARATIVE EXAMPLE | SECOND COMPARATIVE EXAMPLE |
|---|---|---|---|---|---|---|
| EFFECTIVE ENERGY DIFFERENCE ΔE (keV) | | 41.5 | 41.0 | 40.0 | 17.0 | 19.5 |
| DOSE RATIO (%) (RADIATION IMAGING PANEL 101) /(RADIATION IMAGING PANEL 102) | | 3.5 | 8.5 | 15.8 | 18.0 | 15.0 |
| MTF AT 2 lp/mm | RADIATION IMAGING PANEL 101 | 0.350 | 0.360 | 0.365 | 0.350 | 0.350 |
| | RADIATION IMAGING PANEL 102 | 0.330 | 0.335 | 0.340 | 0.320 | 0.340 |
| MATERIAL DISCRIMINATION $\mu_1/\mu_2$ RATIO | 2-mm THICK Al PLATE/ 6-mm THICK Al PLATE | 1.17 | 1.05 | 1.00 | 1.38 | 1.33 |
| | 20-mm THICK ACRYLIC PLATE/ 6-mm THICK Al PLATE | 2.00 | 2.20 | 2.25 | 1.70 | 1.78 |

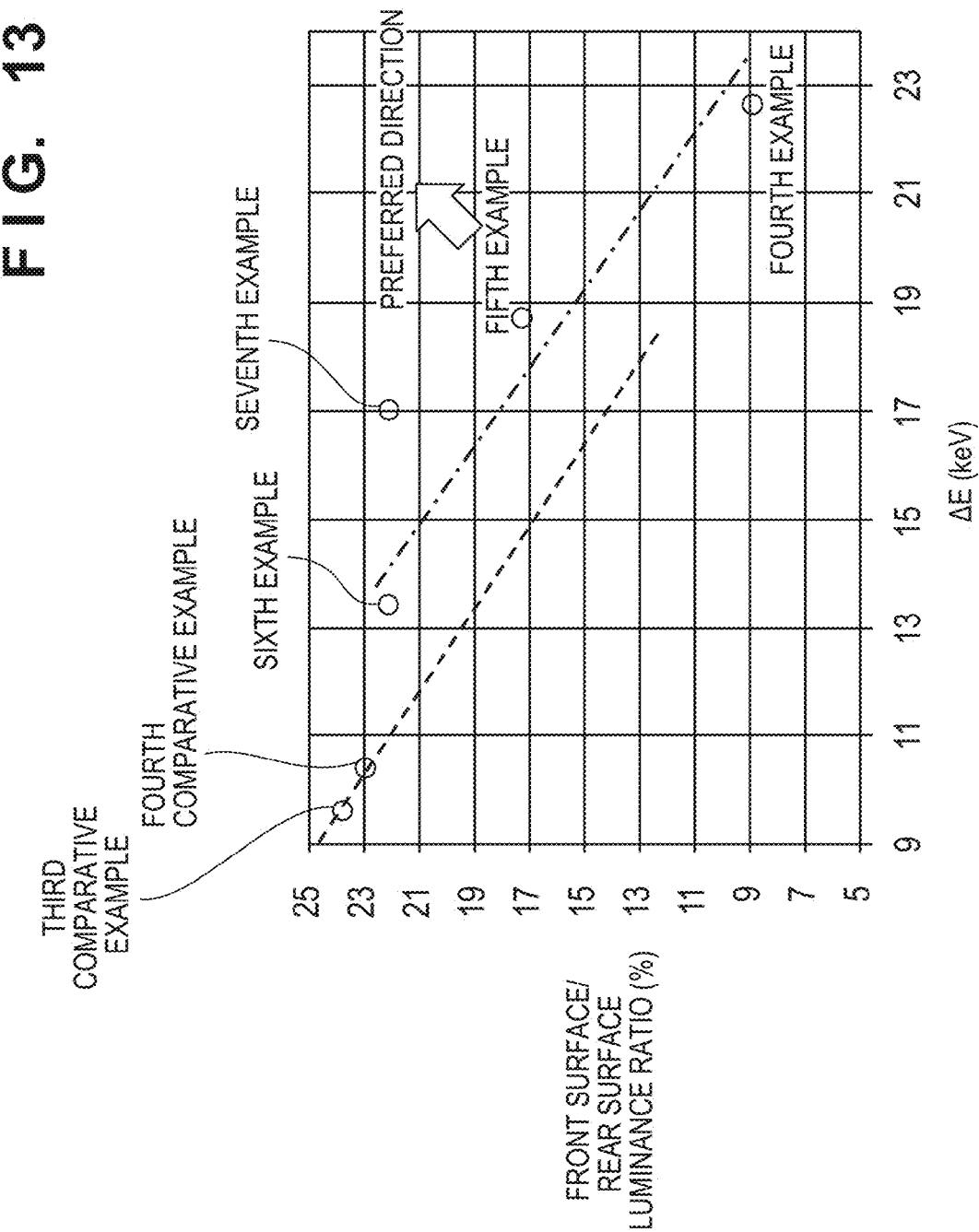

FIG. 14

| | | THIRD COMPARATIVE EXAMPLE | FOURTH COMPARATIVE EXAMPLE | FOURTH EXAMPLE | FIFTH EXAMPLE | SIXTH EXAMPLE | SEVENTH EXAMPLE |
|---|---|---|---|---|---|---|---|
| STACKING STRUCTURE | | FIG.6B | FIG.6C | FIG.6A | FIG.6A | FIG.6A | FIG.6A |
| CsI FILM THICKNESS (μm) | RADIATION IMAGING PANEL 101 | 400 | 400 | 400 | 200 | 100 | 100 |
| | RADIATION IMAGING PANEL 102 | 400 | 400 | 400 | 600 | 600 | 600 |
| FIRST RADIATION ABSORBING PORTION | MATERIAL TYPE | NONE | NONE | Ce2O3 | Ce2O3 | Ce2O3 | Ce2O3 |
| | MATERIAL FILM THICKNESS (μm) | | | 500 | 500 | 500 | 500 |
| | MATERIAL FILLING FACTOR (%) | | | 50 | 50 | 50 | 50 |
| SECOND RADIATION ABSORBING PORTION | MATERIAL TYPE | NONE | NONE | NONE | NONE | NONE | Cu |
| | MATERIAL FILM THICKNESS (μm) | | | | | | 100 |
| | MATERIAL FILLING FACTOR (%) | | | | | | 100 |
| AVERAGE ENERGY DIFFERENCE ΔE (keV) | | 9.6 | 10.4 | 22.6 | 18.7 | 13.4 | 17.0 |
| LUMINANCE RATIO (%) (RADIATION IMAGING PANEL 101)/(RADIATION IMAGING PANEL 102) | | 23.8 | 23.0 | 9.0 | 17.3 | 22.2 | 22.1 |
| MTF AT 2 lp/mm | RADIATION IMAGING PANEL 101 | 0.35 | 0.35 | 0.35 | 0.38 | 0.39 | 0.39 |
| | RADIATION IMAGING PANEL 102 | 0.32 | 0.34 | 0.33 | 0.35 | 0.37 | 0.37 |
| MEASURED VALUE OF THICKNESS (mm) | 2-mm THICK Al PORTION | 1.1 | 1.2 | 2.0 | 1.9 | 1.6 | 1.8 |
| | 6-mm THICK Al PORTION | 3.7 | 3.9 | 6.0 | 5.8 | 5.4 | 5.8 |
| | 20-mm THICK PMMA PORTION | 11.5 | 13.0 | 19.4 | 19.0 | 17.0 | 18.5 |

RADIATION DETECTION APPARATUS AND RADIATION IMAGING SYSTEM

BACKGROUND OF THE INVENTION

Field of the Invention

The present invention relates to a radiation detection apparatus and a radiation imaging system.

Description of the Related Art

Radiation detection apparatuses are widely used for medical imaging diagnosis and non-destructive inspection. There is known a method of obtaining a plurality of radiation images of an object with radiation having different energy components by using such a radiation detection apparatus and obtaining an energy subtraction image with a specific object portion being separated or emphasized based on the differences between the obtained radiation images. Japanese Patent Laid-Open Nos. 5-208000, 2011-235, 2011-22132, 2001-249182, and 2000-298198 have proposed radiation detection apparatuses which record radiation images with radiation having two different energy components by one irradiation of an object with radiation (one shot method) by using two radiation imaging panels to obtain an energy subtraction image. Japanese Patent Laid-Open No. 5-208000 has disclosed that a copper plate is arranged as a member for absorbing low-energy components of radiation between two radiation imaging panels. Japanese Patent Laid-Open Nos. 2011-235 and 2011-22132 have disclosed that a metal plate is used as this member, which contains, as a main component, Al, Ti, Ag, Pb, Fe, Ni, Cu, Zn, La, Cs, Ba, Sn, Sb, Tb, Ce, or Sm and has a thickness of 50 μm to 450 μm. Japanese Patent Laid-Open Nos. 2001-249182 and 2000-298198 have disclosed the use of radiation imaging panels using materials having different radiation absorption characteristics.

SUMMARY OF THE INVENTION

With the copper plate disclosed in Japanese Patent Laid-Open No. 5-208000, it is possible that the high-energy components and the low-energy components of radiation will be insufficiently separated from each other, and an obtained energy subtraction image will deteriorate in quality. In addition, when the metal plates disclosed in Japanese Patent Laid-Open Nos. 2011-235 and 2011-22132 are used in the thickness range of 50 μm to 450 μm, it also poses the same problem as that in Japanese Patent Laid-Open No. 5-208000. Furthermore, a metal plate made of Ag, La, Cs, Ba, Sb, Tb, Ce, or Sm cannot be practically obtained or is very expensive, and hence the manufacturing cost of a radiation detection apparatus is likely to increase. Moreover, according to Japanese Patent Laid-Open Nos. 2001-249182 and 2000-298198, the use of two types of radiation imaging panels increases the number of members constituting a radiation detection apparatus, and hence can increase the manufacturing cost of the radiation detection apparatus.

Some embodiments of the present invention provide a technique advantageous in obtaining an energy subtraction image with one irradiation with radiation by using two radiation imaging panels in a radiation detection apparatus.

According to some embodiments, a radiation detection apparatus comprising: a housing; a first radiation imaging panel and a second radiation imaging panel arranged to overlap each other in the housing; and a radiation absorbing portion arranged between the first radiation imaging panel and the second radiation imaging panel, wherein the radiation absorbing portion comprises a first member with energy at a K-absorption edge being not less than 38 keV and not more than 60 keV, and the first member comprises a resin added with particles containing at least one element selected from the group consisting of lanthanum, cerium, praseodymium, neodymium, promethium, samarium, europium, gadolinium, terbium, dysprosium, holmium, erbium, and thulium, is provided.

According to some embodiments, a radiation detection apparatus comprising: a housing; a first radiation imaging panel and a second radiation imaging panel arranged to overlap each other in the housing; and a radiation absorbing portion arranged between the first radiation imaging panel and the second radiation imaging panel, wherein the radiation absorbing portion comprises a first member containing an element with energy at a K-absorption edge being not less than 38 keV and not more than 60 keV and a second member containing an element other than the element in the first member, and does not generate visible light with respect to the first radiation imaging panel and the second radiation imaging panel, is provided.

Further features of the present invention will become apparent from the following description of exemplary embodiments (with reference to the attached drawings).

BRIEF DESCRIPTION OF THE DRAWINGS

FIG. 2 is a view showing energies at the K-absorption edges of the respective elements of the lanthanoid series;

FIG. 9 is a view showing the evaluation results obtained by examples and comparative examples of the radiation detection apparatus according to the present invention;

FIG. 13 is a graph showing the relationships between ΔE and output ratios in examples and comparative examples of a radiation imaging apparatus according to the present invention;

FIG. 14 is a view showing the evaluation results obtained by examples and comparative examples of the radiation detection apparatus according to the present invention.

DESCRIPTION OF THE EMBODIMENTS

Figure 1A:
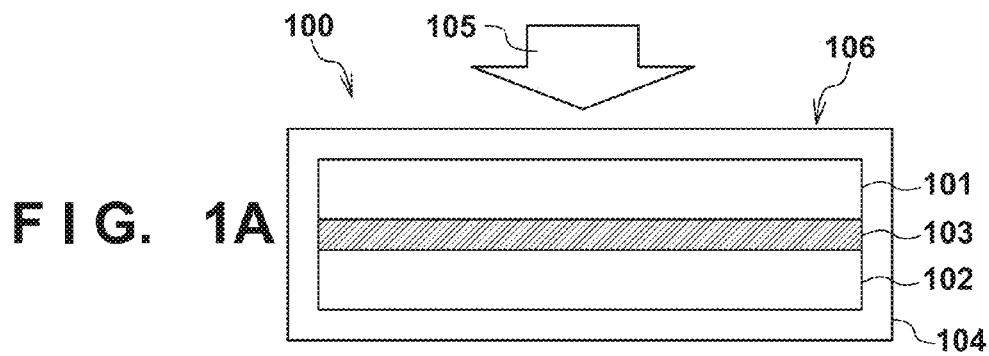
FIGS. 1A to 1D are sectional views showing an example of the arrangement of a radiation detection apparatus according to an embodiment of the present invention.

A specific embodiment of a radiation detection apparatus according to the present invention will be described below with reference to the accompanying drawings. Note that in the following description and drawings, common reference numerals denote common components throughout a plurality of drawings. For this reason, common components will be described with mutual reference to a plurality of drawings, and a description of components denoted by common reference numerals will be omitted where appropriate. Note that radiation in the present invention can include not only α-rays, β-rays, and γ-rays, which are beams generated by particles (including photons) emitted by radiation destruction, but also beams having similar or higher energies, such as X-rays, particle rays, and cosmic rays.

The structure of a radiation detection apparatus according to an embodiment of the present invention will be described with reference to FIGS. 1A to 5B. FIGS. 1A to 1D are sectional views showing an example of the arrangement of a radiation detection apparatus 100 according to an embodiment of the present invention. The radiation detection apparatus 100 shown in FIG. 1A includes a radiation imaging panel 101 and a radiation imaging panel 102 for detecting radiation in one housing 104, together with a radiation absorbing portion 103 arranged between the radiation imaging panel 101 and the radiation imaging panel 102. The radiation detection apparatus 100 includes the two radiation imaging panels 101 and 102 to have an arrangement which can obtain an energy subtraction image by one irradiation of an object with radiation (one shot method). For this purpose, the radiation imaging panels 101 and 102 are arranged so as to overlap each other in orthogonal projection with respect to an incident surface 106 of the housing 104 which is used for irradiation with radiation 105. In addition, in the arrangement of this embodiment shown in each drawing, the radiation imaging panel 101, of the two radiation imaging panels 101 and 102, is arranged on the radiation incident side so as to be closer to the incident surface 106 than the radiation imaging panel 102.

As the radiation imaging panels 101 and 102, imaging panels having the same arrangement may be used. Japanese Patent Laid-Open Nos. 2001-249182 and 2000-298198 have disclosed an arrangement using imaging panels using materials with different radiation absorption characteristics. In this case, the numbers of types of materials and parts used for the radiation detection apparatus may increase, resulting in an increase in manufacturing cost. Using the radiation imaging panels 101 and 102 having the same arrangement may suppress an increase in manufacturing cost.

As shown in FIG. 1A, the radiation imaging panels 101 and 102 may be direct type imaging panels using conversion elements which directly convert incident radiation into electrical signals. In this case, a material such as amorphous selenium (a-Se) can be used for a conversion element.

Figure 1B:
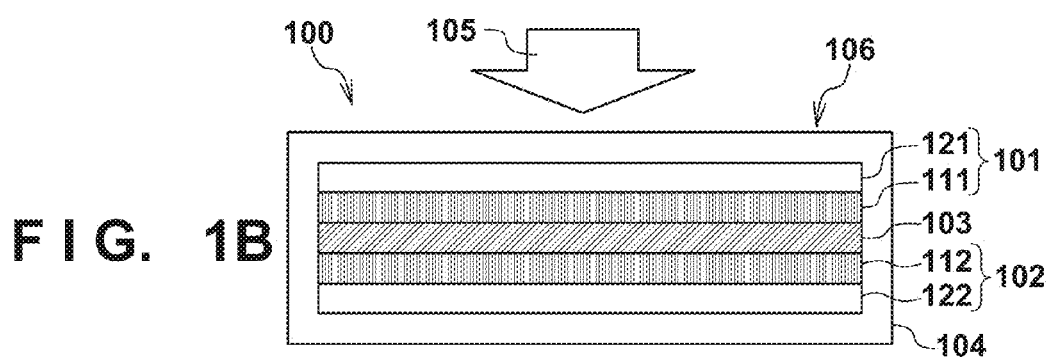

In addition, as shown in FIG. 1B, the radiation imaging panels 101 and 102 may be indirect type imaging panels respectively including scintillators 111 and 112 which convert radiation into light and detection units 121 and 122 which detect the light obtained by conversion by the scintillators 111 and 112. With the arrangement shown in FIG. 1B, in the radiation imaging panel 101, the detection unit 121 detects the light converted from radiation by the scintillator 111. Likewise, in the radiation imaging panel 102, the detection unit 122 detects the light converted from radiation by the scintillator 112.

If the radiation imaging panels 101 and 102 are indirect type imaging panels, the panels may be provided with members arranged to inhibit the detection unit 122 from detecting the light obtained by conversion by the scintillator 111 and to inhibit the detection unit 121 from detecting the light obtained by conversion by the scintillator 112. For example, the radiation imaging panels 101 and 102 may be covered by members made of a metal such as aluminum, a black resin, or the like which shields light obtained by conversion by the scintillators 111 and 112. In addition, for example, the radiation absorbing portion 103 may suppress the detection units 122 and 121 from detecting light obtained by conversion by the scintillators 111 and 112. Making the detection units 122 and 121 difficult to detect light obtained by conversion by the scintillators 111 and 112 can suppress a deterioration in image quality obtained by the detection units 121 and 122.

The detection units 121 and 122 may be silver halide photosensitive films having sensitivity to light converted from the radiation 105 by the scintillators 111 and 112. In addition, the detection units 121 and 122 may be sensor panels including pixel arrays in which a plurality of pixels including photoelectric conversion elements for converting light obtained by conversion by the scintillators 111 and 112 into electrical signals are arrayed. Each sensor panel has a plurality of pixels arranged on a substrate made of glass, plastic, or the like. Each pixel includes a photoelectric conversion element such as a pn-, pin-, or MIS-type photoelectric conversion element formed by using a semiconductor such as silicon and a switch element such as a TFT (Thin-Film Transistor). Alternatively, sensor panels having pixel arrays formed on semiconductor substrates may be used as the detection units 121 and 122. If such sensor panels are to be used as the detection units 121 and 122, the scintillators 111 and 112 may be arranged on the pixel arrays formed on the substrates.

Figure 1C:
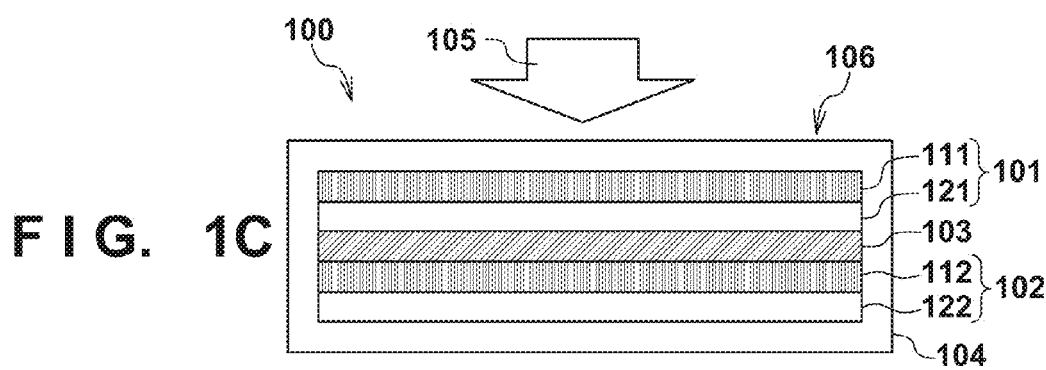

If the radiation imaging panels 101 and 102 are indirect type imaging panels, the arrangement of the scintillators 111 and 112 and the detection units 121 and 122 is not limited to the arrangement shown in FIG. 1B, in which the scintillators 111 and 112 face each other through the radiation absorbing portion 103. For example, as shown in FIG. 1C, in both the radiation imaging panels 101 and 102, the scintillators 111 and 112 and the detection units 121 and 122 may be sequentially arranged side by side from the incident surface 106 side. In this case, for example, both the detection units 121 and 122 may be sensor panels or the detection unit 121 may be a sensor panel and the detection unit 122 may be a silver halide photosensitive film.

Figure 1D:
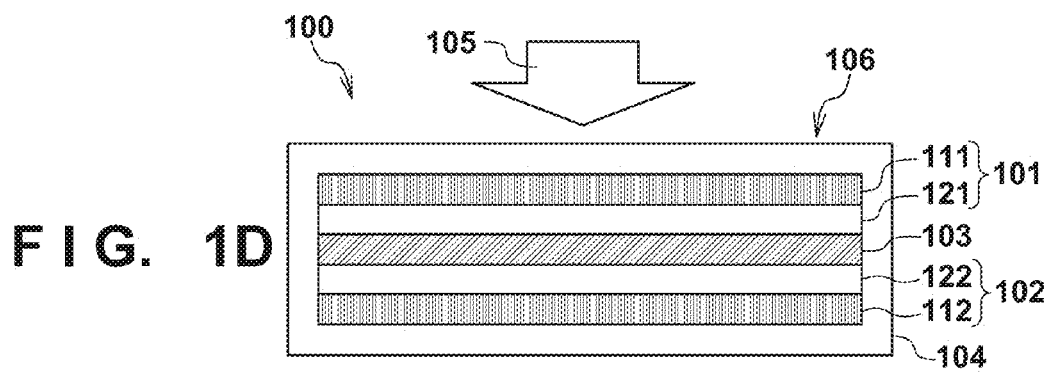
Figure 3:
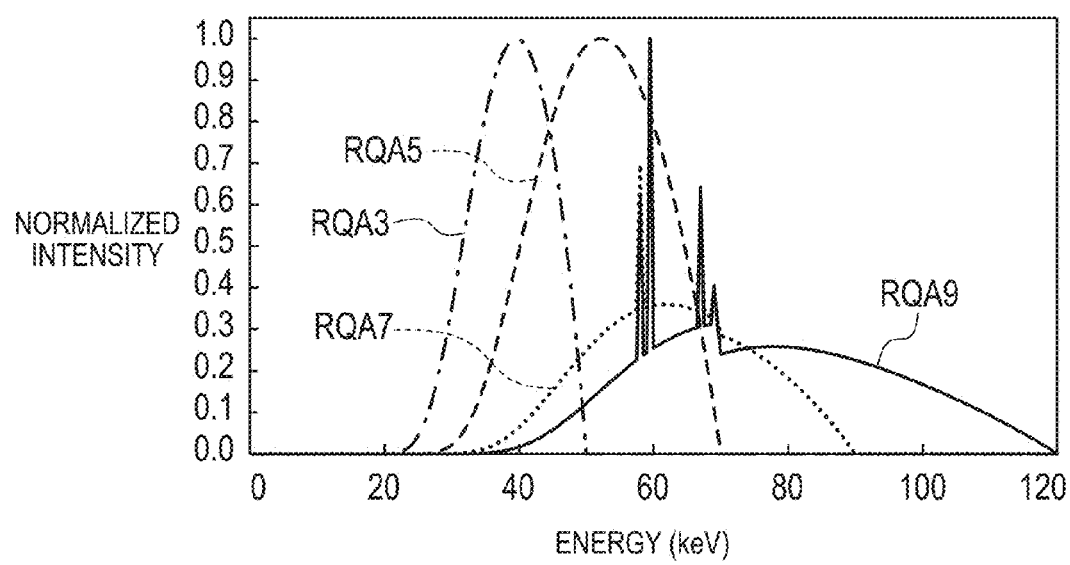
FIGS. 3A and 3B are views showing the radiation qualities (RQA3, RQA5, RQA7, and RQA9) of X-rays.

Alternatively, for example, as shown in FIG. 1D, the detection units 121 and 122 respectively included in the radiation imaging panels 101 and 102 may be adjacent to each other and face each other through the radiation absorbing portion 103. In this case, sensor panels may be used as both the detection units 121 and 122. The scintillator 112 of the radiation imaging panel 102 converts the radiation 105 transmitted through the radiation imaging panel 101 and the radiation absorbing portion 103 into light. In the arrangement shown in FIG. 1D, the scintillator 112 can convert the radiation 105 into light in a range of the scintillator 112 which is located near the detection unit 122. For this reason, the light converted from radiation by the scintillator and detected by the detection unit 122 is robust against the influence of scattering in the scintillator 112. This makes it possible to improve the spatial resolution of an obtained image.

The radiation absorbing portion 103 will be described next. The radiation absorbing portion 103 includes an absorbing member for absorbing low-energy components of the incident radiation 105 passing through the radiation imaging panel 101 to make the radiation imaging panel 101 and the radiation imaging panel 102 obtain radiation images with different energy components. For this reason, high-energy components of the radiation 105 entering the radiation detection apparatus 100 tend to enter the radiation imaging panel 102. This can improve the ability to separate or emphasize a specific object portion of the energy subtraction image obtained from the differences between a plurality of radiation images with different energy components.

This embodiment uses a member with energy at the K-absorption edge being 38 keV or more and 60 keV or less as the absorbing member of the radiation absorbing portion 103. FIG. 2 shows the energies at the K-absorption edges of the respective elements of the lanthanoid series. The respective elements of the lanthanoid series have K-absorption edge energies between 38.92 eV and 63.31 keV. A lanthanoid element having a K-absorption edge energy of 38 keV or more and 60 keV or less may be selected, as needed, from the lanthanoid series for an absorbing member. More specifically, an absorbing member may contain at least one of lanthanum, cerium, praseodymium, neodymium, promethium, samarium, europium, gadolinium, terbium, dysprosium, holmium, erbium, and thulium. An absorbing member may be a plate-like or foil-like member made of such a lanthanoid material. Alternatively, for example, an absorbing member may be a plate-like or foil-like member made of such a lanthanoid compound. A lanthanoid compound may be a lanthanoid oxide, lanthanoid nitride, or lanthanoid oxynitride. In addition, for example, an absorbing member may be a resin added with particles containing a lanthanoid material (a lanthanoid element or compound). Furthermore, for example, an absorbing member may be an alloy of a lanthanoid metal and a metal other than the lanthanoid metals. An absorbing member may be a member containing a lanthanoid element or compound at a filling factor of 50% or more. The filling factor is the ratio of the lanthanoid element or compound to the member. In addition, for example, an absorbing member may be a composite layer including a lanthanoid member containing a lanthanoid material (a plate-like or foil-like member made of a lanthanoid element or compound or a resin added with lanthanoid element or compound particles) and a non-lanthanoid member containing an element other than the lanthanoid elements. The non-lanthanoid member of this composite layer, other than the lanthanoid elements or lanthanoid compounds, may be a metal plate containing at least one of Cu (copper), Ag (silver), Zn (zinc), and Sn (tin).

The absorbing member of the radiation absorbing portion 103 preferably has a film thickness of 100 μm or more in a direction intersecting with the incident surface 106 to sufficiently achieve the purpose of absorbing radiation. However, the absorbing member preferably has a film thickness of 1,000 μm or less to make the radiation imaging panel 102 transmit radiation of high-energy components to obtain a radiation image and ensure the spatial resolution of an image obtained by the radiation imaging panel 102. In addition, the absorbing member may have a film thickness of 300 μm or less to make the radiation imaging panel 102 transmit more radiation.

The absorbing member is required to have a relatively large film thickness of 100 μm or more, and hence is sometimes difficult to form by using a vacuum deposition method or sputtering method. For this reason, as described above, a plate or foil made of a lanthanoid material may be used as an absorbing member. Alternatively, for example, a paste may be prepared by mixing lanthanoid element or compound particles in a resin, and the paste may be formed into a thick film on a base by using a screen printing method or the like, thereby using the resultant resin sheet as an absorbing member. In this case, the base and the absorbing member may constitute the radiation absorbing portion 103. As the base, a thin member such as a resin film or glass may be used, although not specifically limited. Alternatively, when the above composite layer is used as an absorbing member, a metal plate as an absorbing member may be used as a base, other than a lanthanoid element or compound plate forming a composite layer. In this case, the metal plate may have a thickness of 0.2 mm or less. This metal plate may be used as an electromagnetic shield to which a fixed potential such as a ground potential is supplied. In the arrangements shown in FIGS. 1C and 1D, the radiation absorbing portion 103 is shown as an independent portion. However, for example, in the arrangement shown in FIG. 1C, the substrate of the sensor panel used as the detection unit 121 may contain a lanthanoid element or compound. In addition, in the arrangement shown in FIG. 1D, the substrates of the sensor panels used as the detection units 121 and 122 may contain a lanthanoid element or compound. The substrates of the sensor panels used as the detection units 121 and 122 each may contain a lanthanoid element or compound to function as the radiation absorbing portion 103.

The effects of this embodiment using a lanthanoid material for the absorbing member of the radiation absorbing portion 103 will be described next. There is available a method complying with IEC62220-1 as a method of evaluating a sensor panel on which pixels, each including a photoelectric conversion element for converting radiation into charge and a switch element such as a TFT, are arranged. This evaluation method proposes to use RQA3, RQA5, RQA7, and RQA9 defined by IEC61267 as the radiation qualities of X-rays as radiation in a general imaging region. FIG. 3A shows energy spectra corresponding to RQA3, RQA5, RQA7, and RQA9. FIG. 3B shows effective energies corresponding to RQA3, RQA5, RQA7, and RQA9. As shown in FIGS. 3A and 3B, the effective energies corresponding to RQA3, RQA5, RQA7, and RQA9 range from about 38 keV to about 75 keV. For this reason, using an absorbing member containing a lanthanoid material having a K-absorption edge energy between about 38 keV and about 60 keV as the radiation absorbing portion 103 makes it possible to very effectively separate radiation energies in the general imaging region. This can separate the low-energy components and the high-energy components of radiation and improve the quality of an obtained energy subtraction image.

Figure 4:
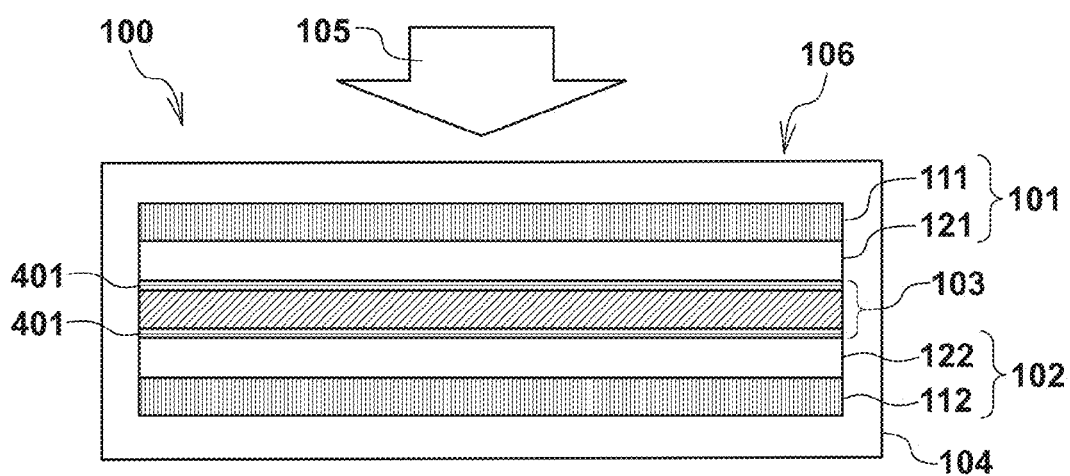
FIG. 4 is a sectional view showing a modification of the radiation detection apparatus in FIGS. 1A to 1D.

In this case, an absorbing member used as the radiation absorbing portion 103 may not emit light to the radiation imaging panels 101 and 102 to which the radiation imaging panels 101 and 102 have sensitivity (which can be detected). That is, an absorbing member used as the radiation absorbing portion 103 may not cause radioluminescence when absorbing radiation. For example, the absorbing member may emit no visible light. In addition, for example, the absorbing member may not convert radiation into visible light like the scintillators 111 and 112. In other words, as an absorbing member, a member having a composition different from that of the members used for the scintillators 111 and 112 can be used. In addition, if an absorbing member emits visible light by radioluminescence upon receiving radiation, the radiation absorbing portion 103 may include a light-shielding member 401 for shielding visible light to the radiation imaging panels 101 and 102, as shown in FIG. 4. The light-shielding member 401 can be arranged at least between the detection unit 121 and the absorbing member or between the detection unit 122 and the absorbing member. In addition, for example, the light-shielding members 401 may be respectively arranged between the detection unit 121 and the absorbing member and between the detection unit 122 and the absorbing member. Alternatively, the light-shielding member 401 may be arranged to cover the entire absorbing member. For example, a metal film such as an aluminum film or a black resin may be used for the light-shielding member 401. In addition, for example, the substrates of the detection units 121 and 122 using sensor panels may have the function of the light-shielding member 401.

The scintillators 111 and 112 included in the radiation imaging panels 101 and 102 will be described next. When obtaining an energy subtraction image, as described above, it is necessary to separate the low-energy components and the high-energy components of the incident radiation 105 by using the radiation absorbing portion 103 which absorbs proper energy. In addition, if the radiation imaging panels 101 and 102 shown in FIGS. 1B to 1D use the scintillators 111 and 112, it is necessary to also consider the amounts of radiation absorbed by the scintillators 111 and 112. More specifically, the scintillator 111 absorbs low-energy components as much as possible, and the radiation absorbing portion 103 absorbs low-energy components which have not been able to be absorbed by the scintillator 111. In addition, the scintillator 112 needs to absorb high-energy components as much as possible and convert them into light. The detection unit 122 then needs to detect the light. If the scintillator 111 excessively absorbs the radiation 105, the dose of the radiation 105 reaching the scintillator 112 may decrease. This may lead to a deterioration in signal/noise ratio (SNR).

For this reason, the radiation absorptance of the scintillator 111 may be equal to or less than that of the scintillator 112. Different materials or the same material can be used for the scintillators 111 and 112. If, for example, the scintillators 111 and 112 are formed by using the same material, the product of the film thickness×the filling factor of the scintillator 112 may be equal to or more than that of the scintillator 111. If, for example, the scintillators 111 and 112 are formed by using different materials, the product of the film thickness×the filling factor×the density of the scintillator 112 may be equal to or more than that of the scintillator 111. The film thicknesses of the scintillators 111 and 112 indicate the thicknesses of the scintillators 111 and 112 in a direction intersecting the incident surface 106. In addition, if, for example, a particulate material like terbium activated gallium sulfide ($Gd_2O_2S$:Tb) is added to a resin, the filling factors of the scintillators 111 and 112 each indicate the ratio of the scintillator particles to the resin. Furthermore, the filling factor of a scintillator having a columnar crystal structure which grows from the interface between the detection units 121 and 122, and the scintillators 111 and 112 in a direction intersecting with the interface like thallium activated cesium iodide (CsI:Tl) is defined as follows. In this case, the filling factors indicate the ratios of the areas of the columnar crystals to the total area of the columnar crystals of the scintillators 111 and 112 and the gap between the columnar crystals in orthogonal projection with respect to the interfaces between the detection units 121 and 122 and the scintillators 111 and 112. In addition, the densities of the scintillators 111 and 112 each indicate a physical property value of the material, and is a weight per unit volume of each of the scintillators 111 and 112.

Figure 5A:
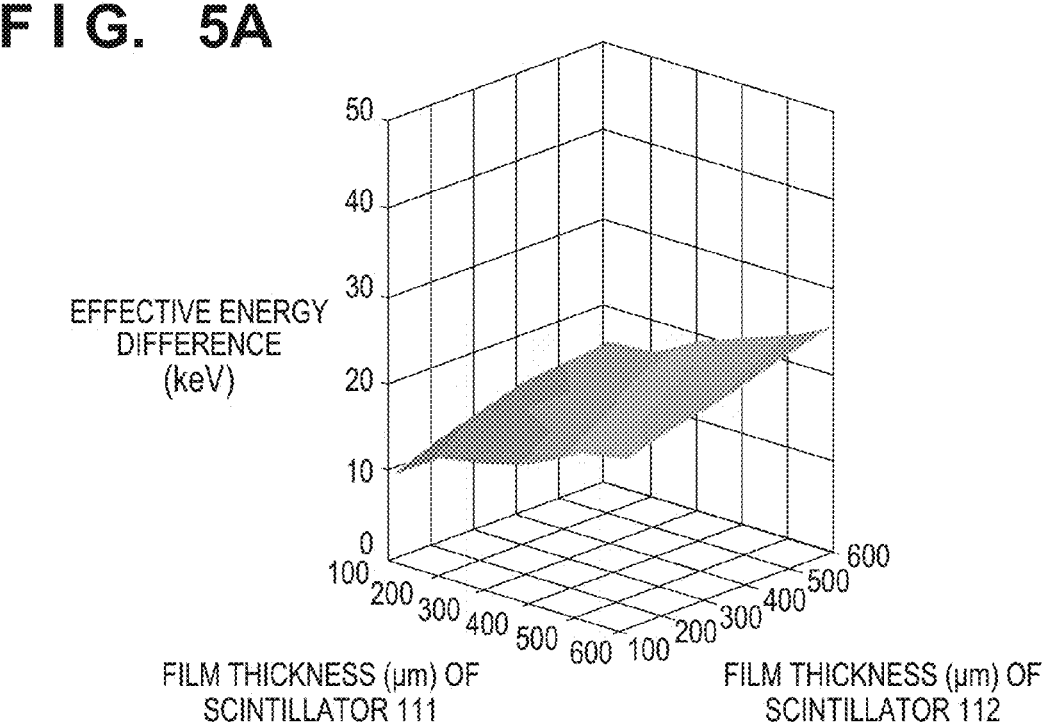
FIGS. 5A and 5B are views each showing the relationship between the film thicknesses of scintillators, effective energies, and dose ratios.
Figure 5B:
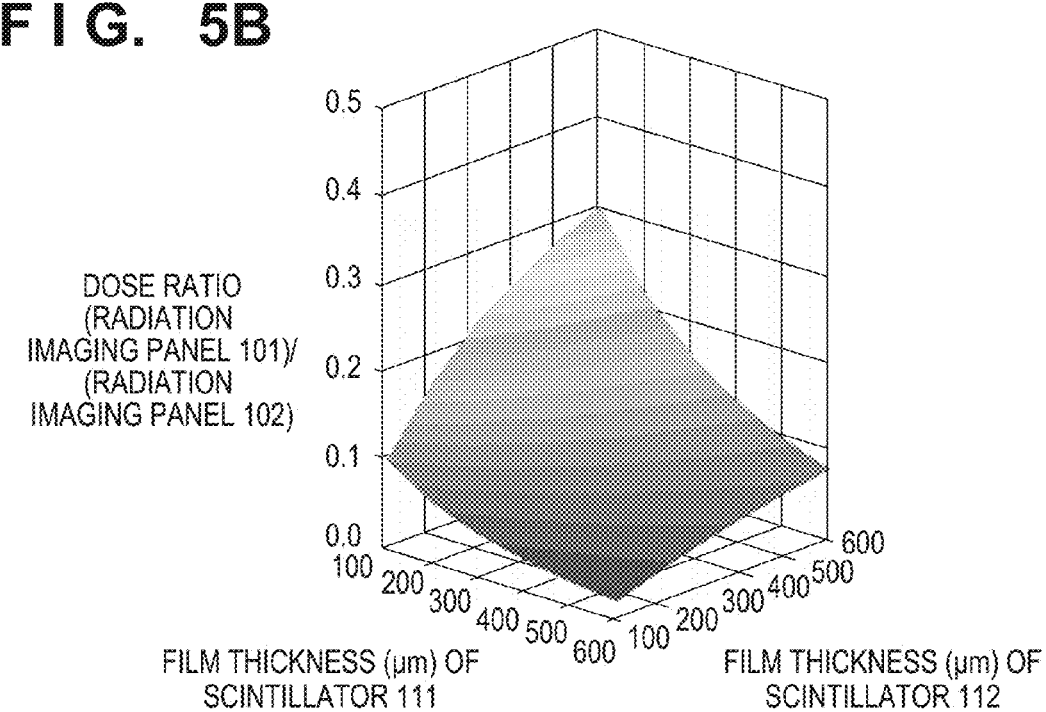

With regard to the radiation detection apparatus 100 having the arrangement shown in FIG. 1D, FIGS. 5A and 5B respectively show the effective energy difference and the dose ratio between the radiation 105 entering the radiation imaging panels 101 and 102 if the film thicknesses of the scintillators 111 and 112 are changed. In this case, FIGS. 5A and 5B show the results obtained when CsI:Tl having the same filling factor and density is used for the scintillators 111 and 112, and the film thickness of each scintillator is changed from 100 µm to 600 µm.

It is obvious from FIG. 5A that as the film thicknesses of both the scintillators 111 and 112 increase, the effective energy difference increases. Meanwhile, it is obvious from FIG. 5B that as the film thickness of the scintillator 111 increases, the dose of the radiation 105 entering the scintillator 112 of the radiation imaging panel 102 decreases. This indicates that if the same material is used for the scintillators 111 and 112, the product of the film thickness×the filling factor of the scintillator 111 may be equal to or more than that of the scintillator 112. That is, the radiation absorptance of the scintillator 111 is preferably lower than that of the scintillator 112.

If CsI:Tl having a columnar crystal structure is used for each of the scintillators 111 and 112, the spatial resolution of an obtained image can be ensured as long as CsI:Tl with a film thickness of 100 µm and a filling factor of about 80% can be formed. If using CsI:Tl, the scintillator 111 of the radiation imaging panel 101 which is arranged on the side where the radiation 105 enters may satisfy film thickness [µm]×filling factor [%]≤8000 [µm·%]

In addition, in this case, if using CsI:Tl, the scintillator 112 may satisfy film thickness [µm]×filling factor [%]≥8000 [µm·%]

The examples of this embodiment will be described with reference to FIGS. 6A to 14. Four comparative examples, that is, first to fourth comparative examples, will be described first as comparative structures with respect to the above embodiment.

First Comparative Example

Figure 6A:
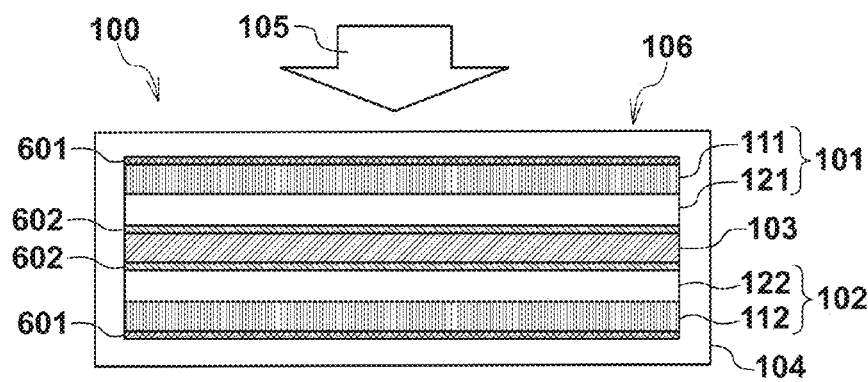
FIGS. 6A to 6C are sectional views showing an example and comparative examples of a radiation detection apparatus according to an embodiment of the present invention.
Figure 6B:
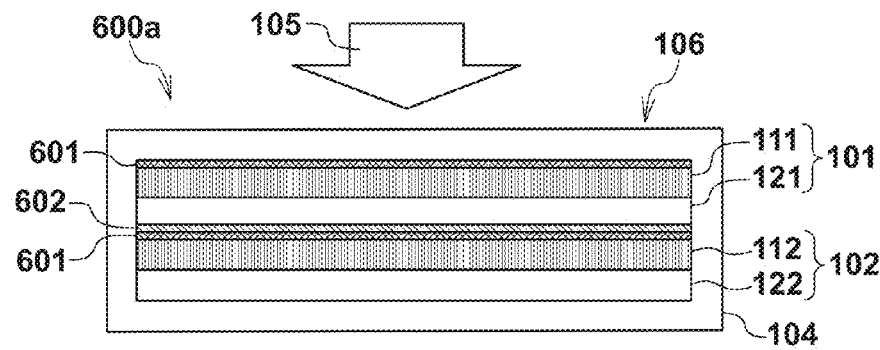

A radiation detection apparatus 600a shown in FIG. 6B was manufactured as the first comparative example. First of all, in order to form sensor panels used as detection units 121 and 122, semiconductor layers using amorphous silicon were formed on alkali-free glass substrates each having a size of 550 mm×445 mm×t0.7 mm. A pixel array including pixels, each including a photoelectric conversion element for converting light into an electrical signal and a TFT, was then formed on each semiconductor layer by repeating vacuum deposition, a photoetching process, and the like. Each pixel array was constituted by 2,816×3,416 pixels. Of the pixels arranged on each pixel array, each set of 8 pixels arranged on the outer peripheral portion is a set of so-called dummy pixels formed to ensure a process margin for dry etching or the like at the time of the formation of a corresponding one of the detection units 121 and 122. These dummy pixels were formed on the outer peripheral portion of the effective pixel region in a width of about 1.2 mm.

Thereafter, in order to protect the pixel arrays, nitride silicon layers and polyimide resin layers were formed to obtain the detection units 121 and 122.

After a masking process was executed to protect the wiring portion and the like formed on the detection units 121 and 122, the detection units 121 and 122 were set in a deposition chamber. After the chamber was evacuated to $10^{-5}$ Pa, the surfaces of the detection units 121 and 122 were heated to 180° C. by a lamp while the detection units 121 and 122 were rotated, thereby performing CsI deposition for the formation of scintillators 111 and 112. At the same time, T1 serving as a light emission center was deposited. In this manner, the scintillators 111 and 112, each having a film thickness of 400 µm and a T1 concentration of 1 mol %, were formed on the detection units 121 and 122.

After the formation of the scintillators 111 and 112, the detection units 121 and 122 on which the scintillators 111 and 112 were formed were removed from the deposition chamber. Subsequently, in order to protect the scintillators 111 and 112 against moisture and ensure their reflectances, a 50-µm thick Al sheet 601 was bonded to each of the scintillators 111 and 112 so as to cover them by using a roll laminator. The Al sheet 601 was coated with a 25-µm thick acrylic-based adhesive for the purpose of bonding. In addition, in order to prevent the entrance of moisture from the periphery, pressure bonding was elaborately performed on the peripheral portion of the Al sheet 601. Thereafter, a pressure defoaming process was performed to remove bubbles, and necessary electric implementation, bonding of buffer members, connection of electric circuits, implementation on mechanical portions, and the like were performed to obtain the radiation imaging panels 101 and 102.

Subsequently, a 10-µm thick acrylic adhesive sheet 602 was transferred onto the side of the radiation imaging panel 102 on which the Al sheet 601 was formed, and the release film was peeled off. The acrylic adhesive sheet 602 was then bonded to the detection unit 121 of the radiation imaging panel 101 upon positioning with reference to an outer shape reference. By using the above steps, the two radiation imaging panels 101 and 102 were stacked on each other to obtain the radiation detection apparatus 600a which was able to perform energy subtraction by one shot.

The radiation detection apparatus 600a was irradiated with radiation from an SID (Source Image receptor Distance) of 130 cm under the condition of a tube voltage of 150 kV, a tube current of 200 mA, fixed filtration 1.9-mm thick Al, and no added filter. Radiation images were respectively obtained by the radiation imaging panels 101 and 102 by irradiation with radiation.

When an MTF chart was placed on the Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.320.

In addition, a 20-mm thick acrylic plate, a 2-mm thick Al plate, and a 6-mm thick Al plate were mounted on the Al sheet 601 of the radiation imaging panel 101, and an image was obtained. Mass decreasing rate coefficient ratios $\mu_1/\mu_2$ of the low energy components and the high-energy component of radiation were calculated from the obtained image according to the following equation at the portion where the 20-mm thick acrylic plate, the 2-mm thick Al plate, and the 6-mm thick Al plate were mounted.

Letting $I_0$ be an incident radiation intensity and I be a transmitted radiation intensity, $$I/I_0 = \exp(-\mu t d) \qquad (1)$$

where µ is a mass decreasing rate coefficient, t [cm] is the thickness of a transmission substance, and d [g/cm³] is the density of the transmission substance. Assume also that $I_{10}$ is the sensitivity value of the radiation imaging panel 101, which obtains an image of the low-energy components of radiation, without any object, and $I_1$ is the sensitivity value after radiation is transmitted through the object. In addition, letting $I_{20}$ be the sensitivity value of the radiation imaging panel 102, which obtains an imaging of the high-energy components of radiation, without any object, and $I_2$ is the sensitivity value after radiation is transmitted through the object, $$\begin{aligned}(I_1/I_{10})/(I_2/I_{20}) &= \exp(-\mu_1 t d)/\exp(-\mu_2 t d) \qquad (2)\\ &= \exp(\mu_1/\mu_2) \therefore \log(I_1/I_{10})/(I_2/I_{20})\\ &= \mu_1/\mu_2\end{aligned}$$

Since $\mu_1/\mu_2$ given by equation (2) is a physical property value, the value does not depend on the thickness of the material. That is, as the $\mu_1/\mu_2$ ratio between the 20-mm thick acrylic plate and the 2-mm thick Al plate and the 6-mm thick Al plate increases, the material discrimination ability increases. In addition, as the $\mu_1/\mu_2$ ratio between the 2-mm thick Al plate and the 6-mm thick Al plate decreases, the material discrimination ability increases.

In the radiation detection apparatus 600a according to this comparative example, the $\mu_1/\mu_2$ ratio between the 20-mm thick acrylic plate and the 6-mm thick Al plate was 1.70, and the $\mu_1/\mu_2$ between the 2-mm thick Al plate and the 6-mm thick Al plate was 1.38.

In addition, a radiation spectrum was measured by EMF123-0 available from EMF Japan Co., Ltd. An effective energy difference ΔE and the dose ratio between radiation entering the radiation imaging panel 101 and radiation entering the radiation imaging panel 102 were calculated from this spectrum and the mass decreasing rate coefficient of the constituent material. In the radiation detection apparatus 600a according to this comparative example, the effective energy difference ΔE was 17 keV and the dose ratio was 18%.

Second Comparative Example

Figure 6C:
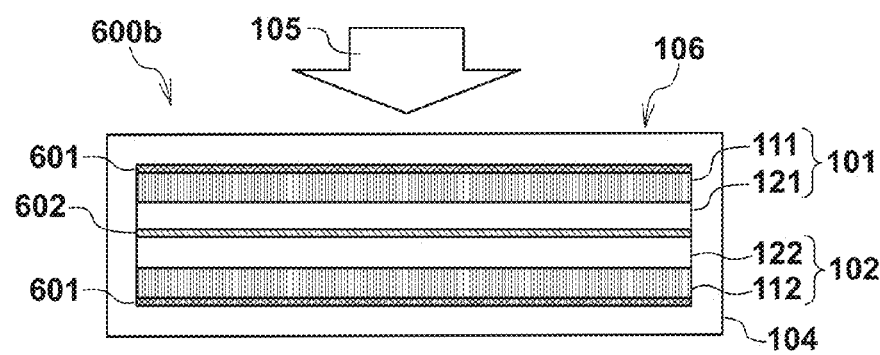

A radiation detection apparatus 600b shown in FIG. 6C was manufactured as the second comparative example. First of all, radiation imaging panels 101 and 102 were obtained by the same method as that in the first comparative example. Subsequently, a 10-µm thick acrylic adhesive sheet 602 was transferred onto a detection unit 122 of the radiation imaging panel 102, and the release film was peeled off. The acrylic adhesive sheet 602 was then bonded to a detection unit 121 of the radiation imaging panel 101 upon positioning with reference to an outer shape reference. By using the above steps, the two radiation imaging panels 101 and 102 were stacked on each other to obtain the radiation detection apparatus 600b which was able to perform energy subtraction by one shot.

Radiation images were respectively obtained by the radiation imaging panels 101 and 102 by irradiating the manufactured radiation detection apparatus 600b with radiation under the same condition as that in the first comparative example.

When an MTF chart was placed on an Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.340.

In the radiation detection apparatus 600b according to this comparative example, the $\mu_1/\mu_2$ ratio between the 20-mm thick acrylic plate and the 6-mm thick Al plate was 1.78, and the $\mu_1/\mu_2$ between the 2-mm thick Al plate and the 6-mm thick Al plate was 1.33.

In addition, in the radiation detection apparatus 600b according to this comparative example, the effective energy difference ΔE between the radiation imaging panel 101 and the radiation imaging panel 102 was 19.5 keV and the dose ratio was 15%.

The MTF of the radiation imaging panel 102 improved for the following reason. As compared with the first comparative example, radiation was transmitted through not only the detection unit 121 but also the detection unit 122 before entering a scintillator 112. For this reason, low-energy Compton scattered radiation and secondary radiation generated when the radiation entered a scintillator 111 were absorbed by both the detection units 121 and 122 instead of only the detection unit 121. In addition, the reason why the material discrimination ability improved is that the influences of Compton scattered radiation and secondary radiation of low-energy components were suppressed in the above manner.

Third Comparative Example

A radiation detection apparatus 600a shown in FIG. 6B was manufactured as the third comparative example. First of all, radiation imaging panels 101 and 102 were obtained by the same method as that in the first comparative example. Al sheets 601 for protecting scintillators 111 and 112 against moisture and ensuring their reflectances were pressure-bonded to the scintillators 111 and 112 by using a 25-µm thick polymethylmethacrylate resin (PMMA)-based adhesive. Subsequently, a 10-µm thick PMMA adhesive sheet 602 was transferred onto the side of the radiation imaging panel 102 on which the Al sheet 601 was formed. The release film was peeled off. The PMMA adhesive sheet 602 was then bonded to a detection unit 121 of the radiation imaging panel 101 upon positioning with reference to an outer shape reference. By using the above steps, the two radiation imaging panels 101 and 102 were stacked on each other to obtain the radiation detection apparatus 600a which was able to perform energy subtraction by one shot.

The radiation detection apparatus 600a was irradiated with radiation from an SID (Source Image receptor Distance) of 175 cm under the condition of a tube voltage of 140 kV, a tube current of 80 mA, fixed filtration 1.9-mm thick Al, and no added filter. Radiation images were respectively obtained by the radiation imaging panels 101 and 102 by irradiation with radiation.

When an MTF chart was placed on the Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.320.

In addition, a 20-mm thick PMMA plate, a 2-mm thick Al plate, and a 6-mm thick Al plate were mounted on an Al sheet 601 of the radiation imaging panel 101, and the resultant structure was irradiated with radiation, thereby respectively obtaining images from the radiation imaging panel 101 and the radiation imaging panel 102. The thicknesses of the 20-mm thick PMMA plate, the 2-mm thick Al plate, and the 6-mm thick Al plate were calculated from the obtained images according to the following principle.

In this case, letting $I_0$ be the intensity of incident radiation, I be the intensity of radiation transmitted through a substance formed from an i component, $t_i$ [cm] be the thickness of the substance formed from the i component, and $\mu_i$ be the linear attenuation coefficient of the substance made of the i component, $$I/I_0 = \exp(-\mu_1 t_1)\exp(-\mu_1 t_1) \ldots \exp(-\mu_n t_n) = \exp\left(-\sum_{i=1}^{n} \mu_n t_n\right) \therefore \quad (3)$$

$$-\log(I/I_0) = \sum_{i=1}^{n} \mu_n t_n$$

In equation (3), if i=2, that is, in the case of two components, binary simultaneous equations are used, and hence a thickness ti of the i component can be calculated. In the case of two components, for example, $-\log(I/I_0)=\mu_1 t_1+\mu_2 t_2$. In addition, letting L be an image obtained from the radiation imaging panel 101 and H be an image obtained from the radiation imaging panel 102, with regard to the radiation imaging panel 101, $-\log(IL/I_0 L)=\mu_1 Lt_1+\mu_2 Lt_2$. Meanwhile, with regard to the radiation imaging panel 102, $-\log(IH/I_0 H)=\mu_1 Ht_1+\mu_2 Ht_2$. Solving the above simultaneous equations can calculate the thickness of each component.

In this comparative example, the thickness of each component calculated with respect to the 20-mm thick PMMA plate was 11.5 mm, the thickness of each component calculated with respect to the 6-mm thick Al plate was 3.7 mm, and the thickness of each component calculated with respect to the 2-mm thick Al plate was 1.1 mm.

In addition, a radiation spectrum was measured by EMF123-0 available from EMF Japan Co., Ltd. An effective energy difference ΔE and the dose ratio between radiation entering the radiation imaging panel 101 and radiation entering the radiation imaging panel 102 were calculated from this spectrum and the mass decreasing rate coefficient of the constituent material. In this comparative example, the effective energy difference ΔE was 9.6 keV and the dose ratio was 23.8%.

Fourth Comparative Example

A radiation detection apparatus 600b shown in FIG. 6C was manufactured as the fourth comparative example. First of all, radiation imaging panels 101 and 102 were obtained by the same method as that in the first comparative example. Subsequently, a 10-µm thick PMMA adhesive sheet 602 was transferred onto a detection unit 122 of the radiation imaging panel 102, and the release film was peeled off. The PMMA adhesive sheet 602 was then bonded to a detection unit 121 of the radiation imaging panel 101 upon positioning with reference to an outer shape reference. By using the above steps, the two radiation imaging panels 101 and 102 were stacked on each other to obtain the radiation detection apparatus 600b which was able to perform energy subtraction by one shot.

Radiation images were respectively obtained by the radiation imaging panels 101 and 102 by irradiating the manufactured radiation detection apparatus 600b with radiation under the same condition as that in the third comparative example.

When an MTF chart was placed on an Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.340.

The thickness of each member was calculated by the same method as that in the third comparative example. In this comparative example, the thickness of each member calculated with respect to the 20-mm thick PMMA plate was 13.0 mm, the thickness of each member calculated with respect to the 6-mm thick Al plate was 3.9 mm, the thickness of each member calculated with respect to the 2-mm thick Al plate was 1.2 mm.

In addition, in the radiation detection apparatus 600b according to this comparative example, the effective energy difference ΔE between the radiation imaging panel 101 and the radiation imaging panel 102 was 10.4 keV and the dose ratio was 23%.

The MTF of the radiation imaging panel 102 improved for the following reason. As compared with the third comparative example, radiation was transmitted through not only the detection unit 121 but also the detection unit 122 before entering a scintillator 112. Therefore, low-energy secondary radiation generated when the radiation entered a scintillator 111 was absorbed by both the detection units 121 and 122 instead of only the detection unit 121. In addition, the reason why the material discrimination ability improved is that the influences of secondary radiation of low-energy components were suppressed in the same manner as described above.

Seven examples, that is, first to seventh examples, will be described next as examples of this embodiment.

First Example

A radiation detection apparatus 100 shown in FIG. 6A was manufactured as the first example. First of all, radiation imaging panels 101 and 102 were obtained by the same method as that in the first and second comparative examples described above. In addition, a radiation absorbing portion 103 including an absorbing member using a lanthanoid material was formed. In this example, a resin added with particles of gadolinium oxide as a compound of gadolinium of the lanthanoid series was used for the absorbing member.

When forming the radiation absorbing portion 103, first of all, a coating paste of gadolinium oxide was prepared. More specifically, 2 kg of gadolinium powder available from NIPPON YTTRIUM CO., LTD were added to 1 kg of terpineol available from the Nippon Koryo Yakuhin Kaisha, LTD and the resultant compound was dispersed and agitated. While the dispersion liquid added with gadolinium oxide was heated to 150° C., a solvent polyvinyl butyral powder was added to the dispersion liquid at a volume ratio of 2.5% to the gadolinium oxide particles, and the resultant compound was dissolved. After the complete dissolution of the compound was confirmed, the compound was naturally cooled to room temperature. After the compound was cooled, butyl carbitol was added to the compound so as to obtain a rotary viscosity of 50 Pa·S at 25° C. and 0.3 rpm, thereby obtaining a coating paste of gadolinium oxide for a slit coater. The obtained coating paste was set on the slit coater by using a 100-μm thick PEN film (Teonex Q51 available from Teijin Dupont Films Japan Limited) as a substrate, and coating was performed by slit coating. After the coating, the substrate was loaded into an IR dryer and dried at 110° C. for 45 min. After the substrate was cooled to room temperature, the substrate was removed from the dryer, thereby obtaining the radiation absorbing portion 103 including the absorbing member using gadolinium oxide on the PEN film substrate.

Figure 7:
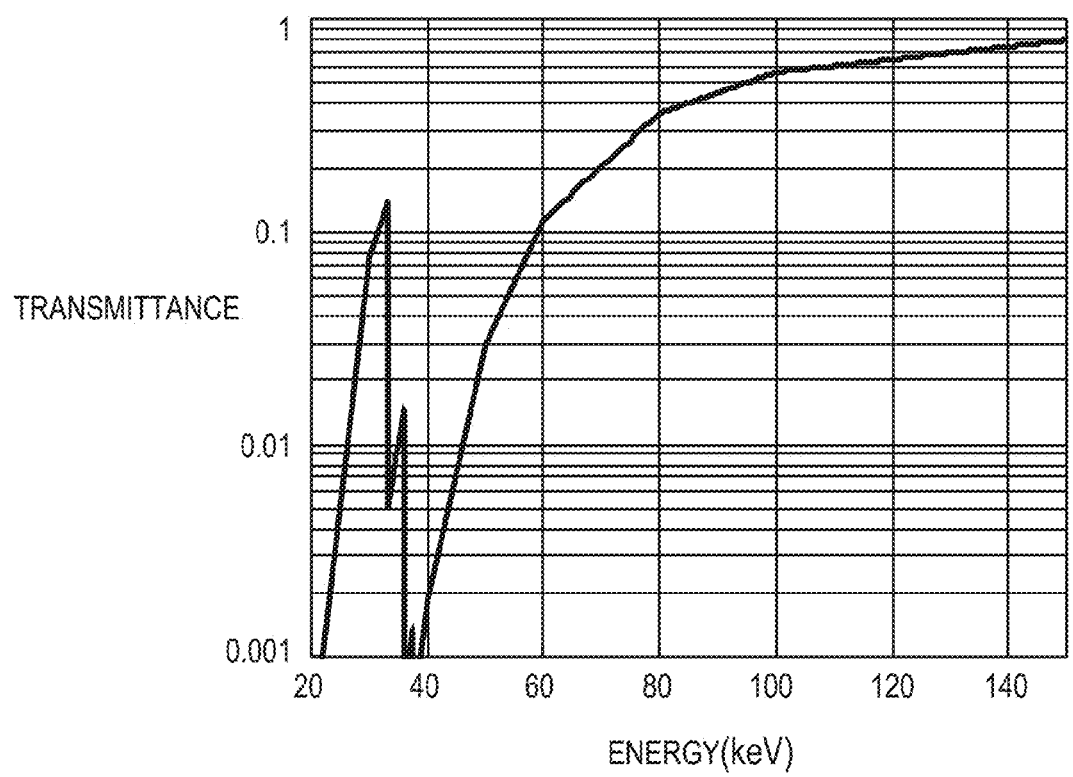
FIG. 7 is a graph showing the radiation transmittance of a radiation absorbing portion of the radiation detection apparatus according to the present invention.

When the film thickness of the absorbing member of the radiation absorbing portion 103 using this gadolinium oxide was measured by using a KEYENCE CORPORATION LT-9030 laser focus displacement meter, the film thickness of the absorbing member was 200 μm, and the film filling factor of gadolinium oxide contained in the absorbing member was 71.4%. FIG. 7 shows the radiation transmittance of the radiation absorbing portion 103 including the absorbing member using gadolinium oxide. It is obvious from FIG. 7 that using the radiation absorbing portion 103 including the absorbing member using gadolinium oxide makes it possible to remove almost all the low-energy components of the incident radiation which are equal to or less than 45 keV.

After the radiation absorbing portion 103 was formed, 10-μm thick acrylic adhesive sheets 602 were transferred onto the two surfaces of the radiation absorbing portion 103, and the release films were peeled off the obverse surface. The acrylic adhesive sheet 602 was then bonded to a detection unit 121 of the radiation imaging panel 101. In addition, the release film was peeled off the reverse surface. The acrylic adhesive sheet 602 was then bonded to a detection unit 122 of the radiation imaging panel 102. By using the above steps, the two radiation imaging panels 101 and 102 were stacked on each other to obtain a radiation detection apparatus 100 which included the radiation absorbing portion 103 between the two radiation imaging panels 101 and 102 and was able to perform energy subtraction by one shot.

This embodiment used the absorbing member made of the resin added with lanthanoid particles as the radiation absorbing portion 103. However, as described above, a lanthanoid material formed into a plate (foil) may be arranged between the radiation imaging panels 101 and 102. For example, a 150-μm thick lanthanoid foil may be inserted as the radiation absorbing portion 103 between the radiation imaging panels 101 and 102.

Radiation images were respectively obtained by the radiation imaging panels 101 and 102 by irradiating the manufactured radiation detection apparatus 100 with radiation under the same condition as that in the first and second comparative examples.

When an MTF chart was placed on an Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.330.

In the radiation detection apparatus 100 according to this example, the $\mu_1/\mu_2$ ratio between the 20-mm thick acrylic plate and the 6-mm thick Al plate was 2.00, and the $\mu_1/\mu_2$ ratio between the 2-mm thick Al plate and the 6-mm thick Al plate was 1.17.

Figure 8A:
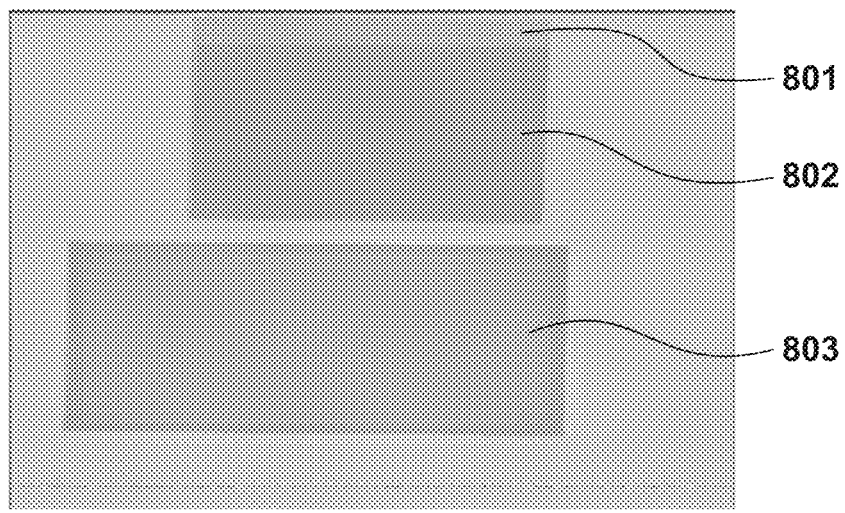
FIGS. 8A and 8B are views each showing an image obtained by using the radiation detection apparatus according to the present invention.
Figure 8B:
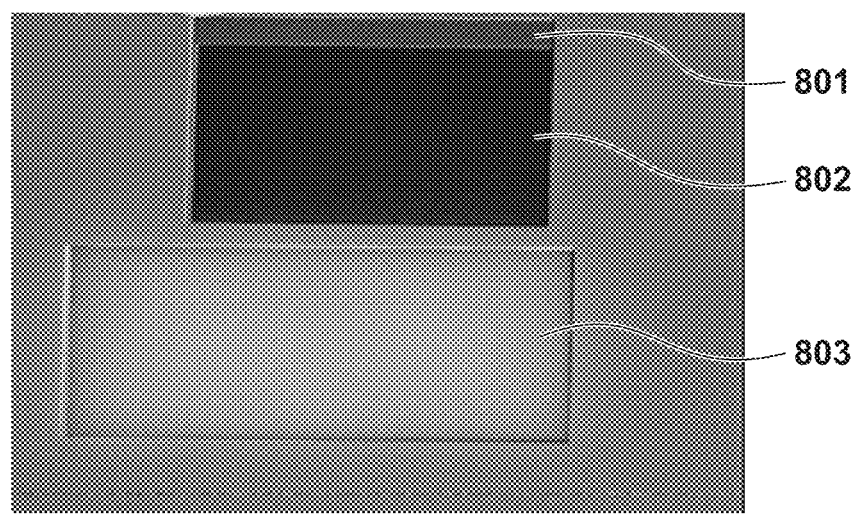

FIG. 8A shows the transmission image obtained by the radiation imaging panel 101 of the radiation detection apparatus 100 formed in this example. FIG. 8B shows the $\mu_1/\mu_2$ image obtained from images obtained by the radiation imaging panels 101 and 102. In FIG. 8A similar to a general transmission image, the contrast of a 20-mm thick acrylic plate 803 is similar to that of a 6-mm thick Al plate 802. Meanwhile, it is obvious that there is a clear contrast difference between a 2-mm thick Al plate 801 and the 6-mm thick Al plate 802. In contrast to this, in the $\mu_1/\mu_2$ image shown in FIG. 8B, it is obvious that the contrast of the 20-mm thick acrylic plate 803 is greatly different from that of the 6-mm thick Al plate 802, and the contrast of the 2-mm thick Al plate 801 is similar to that of the 6-mm thick Al plate 802. This image indicates that in the $\mu_1/\mu_2$ image obtained by the radiation detection apparatus 100, materials can be discriminated regardless of thicknesses.

In addition, in the radiation detection apparatus 100 according to this example, an effective energy difference ΔE between the radiation imaging panel 101 and the radiation imaging panel 102 was 41.5 keV and the dose ratio was 3.5%.

In this example, it was found that the material discrimination ability greatly improved as compared with the first and second comparative examples by arranging the radiation absorbing portion 103 using the absorbing member containing a lanthanoid material between the radiation imaging panels 101 and 102. In addition, arranging the radiation absorbing portion 103 prevented a deterioration in MTF. The effective energy difference ΔE becomes larger than those in the first and second comparative examples because of the presence of the radiation absorbing portion 103. Furthermore, this example used scintillators 111 and 112 both having a thickness of 400 μm, like the first and second comparative examples. For this reason, the dose ratio of the scintillator 112 to the scintillator 111 is lower than those in the first and second comparative examples.

Second Example

As the second example, a radiation detection apparatus 100 was manufactured, which had the same arrangement as that of the first example except that a scintillator 111 had a film thickness of 200 μm, and a scintillator 112 had a film thickness of 600 μm.

Radiation images were respectively obtained by radiation imaging panels 101 and 102 by irradiating the manufactured radiation detection apparatus 100 with radiation under the same condition as that in each comparative example and each example described above.

When an MTF chart was placed on an Al sheet 601 of the radiation imaging panel 101 and MTFs at a spatial frequency of 2 lp/mm were measured, the MTF of the radiation imaging panel 101 was 0.360, and the MTF of the radiation imaging panel 102 was 0.330.

In the radiation detection apparatus 100 according to this example, the $\mu_1/\mu_2$ ratio between the 20-mm thick acrylic plate and the 6-mm thick Al plate was 2.20, and the $\mu_1/\mu_2$ ratio between the 2-mm thick Al plate and the 6-mm thick Al plate was 1.05.

In addition, in the radiation detection apparatus 100 according to this example, an effective energy difference ΔE between the radiation imaging panel 101 and the radiation imaging panel 102 was 41.0 keV and the dose ratio was 8.5%.

In this example, the dose of radiation reaching the radiation imaging panel 102 increased by decreasing the film thickness of the scintillator 111 of the radiation imaging panel 101 which was located on the radiation incident side. In addition, the dose of radiation detected increased and a deterioration in signal/noise ratio was suppressed with an increase in the film thickness of the scintillator 112 of the radiation imaging panel 102 which detected radiation transmitted through the radiation imaging panel 101. This improved the material discrimination ability as compared with the first example. In addition, the film thickness of the scintillator 111 was decreased to suppress the diffusion of light in the scintillator 111 and improve the MTF of the radiation imaging panel 101 as compared with the first example. Since the film thickness of the scintillator 111 was small, the effective energy difference was smaller than that in the first example, and the dose ratio improved.

Third Example

As the third example, a radiation detection apparatus 100 was manufactured, which had the same arrangement as that of the first and second examples except that a scintillator 111 had a film thickness of 100 μm, and a scintillator 112 had a film thickness of 600 μm.

Radiation images were respectively obtained by radiation imaging panels 101 and 102 by irradiating the manufactured radiation detection apparatus 100 with radiation under the same condition as that in each comparative example and each example described above.

When an MTF chart was placed on an Al sheet 601 of the radiation imaging panel 101 and MTFs at a spatial frequency of 2 lp/mm were measured, the MTF of the radiation imaging panel 101 was 0.365, and the MTF of the radiation imaging panel 102 was 0.340.

In the radiation detection apparatus 100 according to this example, the $\mu_1/\mu_2$ ratio between the 20-mm thick acrylic plate and the 6-mm thick Al plate was 2.25, and the $\mu_1/\mu_2$ between the 2-mm thick Al plate and the 6-mm thick Al plate was 1.00.

In addition, in the radiation detection apparatus 100 according to this example, an effective energy difference ΔE between the radiation imaging panel 101 and the radiation imaging panel 102 was 40.0 keV and the dose ratio was 15.8%.

In this example, the material discrimination ability improved by further decreasing the film thickness of the scintillator 111 of the radiation imaging panel 101 which was located on the radiation incident side as compared with the second example. In addition, the film thickness of the scintillator 111 was decreased to suppress the diffusion of light in the scintillator 111 and improve the MTF of the radiation imaging panel 101 as compared with the first and second examples. Since the film thickness of the scintillator 111 was small, the effective energy difference was smaller than that in the first and second examples, and the dose ratio improved. FIG. 9 shows the evaluation results obtained in the first to third examples and the first and second comparative examples.

In the radiation detection apparatus 100 for obtaining an energy subtraction image by one irradiation with radiation, a radiation absorbing portion 103 including a lanthanoid material is arranged between the two imaging panels to separate the high-energy components and the low-energy components of radiation. Obviously, this improved the material discrimination ability with respect to obtained energy subtraction images. In addition, it was found that the material discrimination ability further improved by properly selecting the thicknesses of the scintillators for absorbing radiation and converting it into light.

Fourth Example

A radiation detection apparatus 100 shown in FIG. 6A was manufactured as the fourth example. First of all, radiation imaging panels 101 and 102 were obtained by the same method as that in the third and fourth comparative examples described above. In addition, a radiation absorbing portion 103 including an absorbing member using a lanthanoid material was formed. In this example, a resin added with particles of cerium oxide as a compound of cerium of the lanthanoid series was used for the absorbing member.

When forming the radiation absorbing portion 103, first of all, a coating paste of cerium oxide was prepared. More specifically, 2 kg of cerium oxide powder were added to 1 kg of terpineol, and the resultant compound was dispersed and agitated. While the dispersion liquid added with cerium oxide was heated to 150° C., a solvent polyvinyl butyral powder was added to the dispersion liquid at a volume ratio of 2.5% to the cerium oxide particles, and the resultant compound was dissolved. After the complete dissolution of the compound was confirmed, the compound was naturally cooled to room temperature. After the compound was cooled, butyl carbitol was added to the compound so as to obtain a rotary viscosity of 50 Pa·S at 25° C. and 0.3 rpm, thereby obtaining a coating paste of cerium oxide for a slit coater. The obtained coating paste was set on the slit coater by using a 188-μm thick PET film as a base, and coating was performed by slit coating. After the coating, the substrate was loaded into an IR dryer and dried at 110° C. for 45 min. After the substrate was cooled to room temperature, the substrate was removed from the dryer, thereby obtaining the radiation absorbing portion 103 including the absorbing member using cerium oxide on the PET film base.

Figure 10:
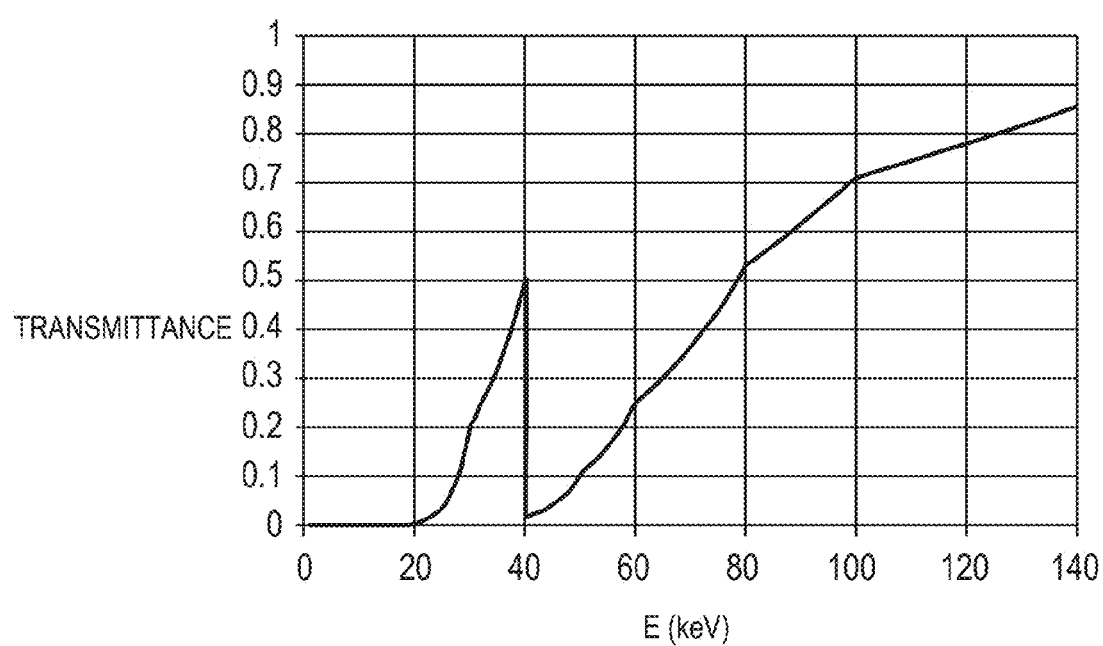
FIG. 10 is a graph showing the radiation transmittance of the radiation absorbing portion of the radiation detection apparatus according to the present invention.

When the film thickness of the absorbing member of the radiation absorbing portion 103 using this cerium oxide was measured by using a KEYENCE CORPORATION LT-9030 laser focus displacement meter, the film thickness of the absorbing member was 500 μm, and the film filling factor of cerium oxide was 50.0%. FIG. 10 shows the radiation transmittance of the radiation absorbing portion 103 including the absorbing member using cerium oxide. It is obvious from FIG. 10 that using the radiation absorbing portion 103 including the absorbing member using cerium oxide makes it possible to effectively remove the low-energy components of the incident radiation which are equal to or less than the K-absorption edge of cerium which is near 40 keV.

After the radiation absorbing portion 103 was formed, 10-μm thick PMMA adhesive sheets 602 were transferred onto the two surfaces of the radiation absorbing portion 103, and the release film was peeled off the obverse surface. The PMMA adhesive sheet 602 was then bonded to a detection unit 121 of the radiation imaging panel 101. The release film was further peeled off the reverse surface. The PMMA adhesive sheet 602 was then bonded to a detection unit 122 of the radiation imaging panel 102. By using the above steps, the two radiation imaging panels 101 and 102 were stacked on each other to obtain a radiation detection apparatus 100 which included the radiation absorbing portion 103 between the radiation imaging panels 101 and 102 and was able to perform energy subtraction by one shot.

Radiation images were respectively obtained by the radiation imaging panels 101 and 102 by irradiating the manufactured radiation detection apparatus 100 with radiation under the same condition as that in the third and fourth comparative examples.

When an MTF chart was placed on an Al sheet 601 of the radiation imaging panel 101 and MTFs at a spatial frequency of 2 lp/mm were measured, the MTF of the radiation imaging panel 101 was 0.350, and the MTF of the radiation imaging panel 102 was 0.330.

In the radiation detection apparatus 100 according to this example, the thickness of each member was calculated by the same method as that in the third comparative example. In the example, the calculated thickness of the 20-mm thick PMMA plate was 19.4 mm, the calculated thickness of the 6-mm thick Al plate was 6.0 mm, and the calculated thickness of the 2-mm thick Al plate was 2.0 mm.

Figure 11A:
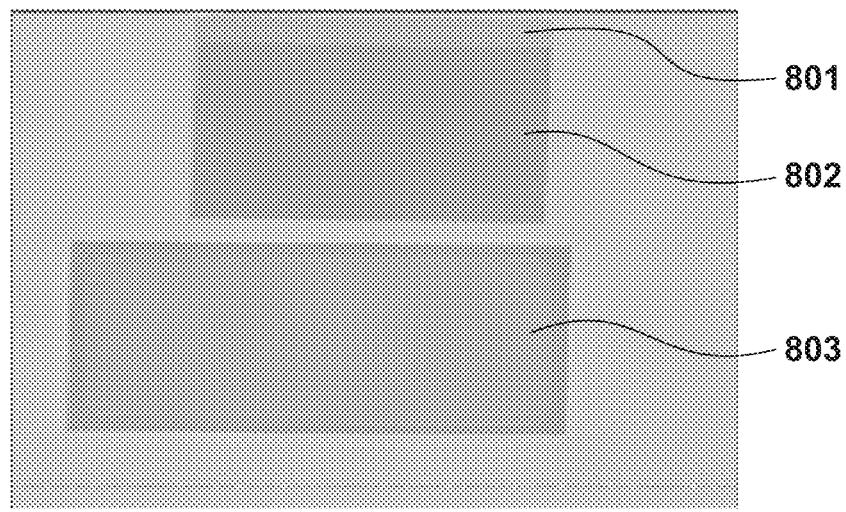
FIGS. 11A and 11B are views each showing an image obtained by using the radiation detection apparatus according to the present invention.
Figure 11B:
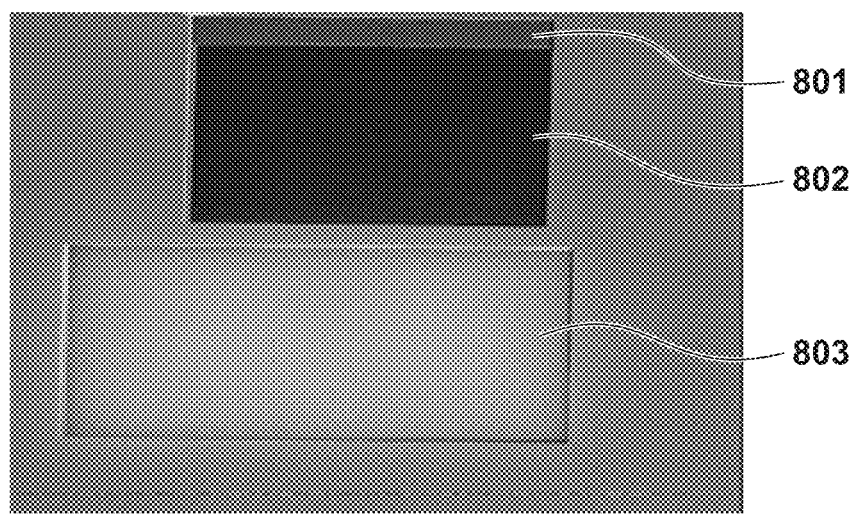

FIG. 11A shows the transmission image obtained by the radiation imaging panel 101 of the radiation detection apparatus 100 formed in this example. FIG. 11B shows the linear attenuation coefficient ratio ($\mu_1/\mu_2$) images obtained from images obtained by the radiation imaging panels 101 and 102. In FIG. 11A similar to a general transmission image, the contrast of a 20-mm thick PMMA plate 803 is similar to that of a 6-mm thick Al plate 802. Meanwhile, it is obvious that there is a clear contrast difference between a 2-mm thick Al plate 801 and the 6-mm thick Al plate 802. That is, this indicates that a substance cannot be discriminated from the general transmission image. In contrast to this, in the linear attenuation coefficient ratio ($\mu_1/\mu_2$) image shown in FIG. 11B, it is obvious that the contrast of the 20-mm thick PMMA plate 803 is greatly different from that of the 6-mm thick Al plate 802, and the contrast of the 2-mm thick Al plate 801 is similar to that of the 6-mm thick Al plate 802. This image indicates that in the linear attenuation coefficient ratio ($\mu_1/\mu_2$) image obtained by the radiation detection apparatus 100, materials can be discriminated regardless of thicknesses.

In addition, in the radiation detection apparatus 100 according to this example, an average energy difference ΔE between the radiation imaging panel 101 and the radiation imaging panel 102 was 22.6 keV and the dose ratio was 9.0%.

In this example, it was found that the material discrimination ability greatly improved as compared with the third and fourth comparative examples by arranging the radiation absorbing portion 103 using the absorbing member containing lanthanoid compound particles between the radiation imaging panels 101 and 102. In addition, arranging the radiation absorbing portion 103 prevented a deterioration in MTF. The effective energy difference ΔE becomes larger than those in the third and fourth comparative examples because of the presence of the radiation absorbing portion 103. Furthermore, this example uses scintillators 111 and 112 both having a thickness of 400 μm, like the third and fourth comparative examples. For this reason, the dose ratio of the scintillator 112 to the scintillator 111 is lower than those in the third and fourth comparative examples.

Fifth Example

As the fifth example, a radiation detection apparatus 100 was manufactured, which had the same arrangement as that of the fourth example except that a scintillator 111 had a film thickness of 200 μm, and a scintillator 112 had a film thickness of 600 μm.

Radiation images were respectively obtained by radiation imaging panels 101 and 102 by irradiating the manufactured radiation detection apparatus 100 with radiation under the same condition as that in the third and fourth comparative examples and the fourth example.

When an MTF chart was placed on an Al sheet 601 of the radiation imaging panel 101 and MTFs at a spatial frequency of 2 lp/mm were measured, the MTF of the radiation imaging panel 101 was 0.380, and the MTF of the radiation imaging panel 102 was 0.350.

In the radiation detection apparatus 100 according to this example, the thickness of each member was calculated by the same method as that in the third comparative example. In the example, the calculated thickness of the 20-mm thick PMMA plate was 19.0 mm, the calculated thickness of the 6-mm thick Al plate was 5.8 mm, and the calculated thickness of the 2-mm thick Al plate was 1.9 mm.

In addition, in the radiation detection apparatus 100 according to this example, an effective energy difference ΔE between the radiation imaging panel 101 and the radiation imaging panel 102 was 18.7 keV and the dose ratio was 17.3%.

In this example, the dose of radiation reaching the radiation imaging panel 102 increased by decreasing the film thickness of the scintillator 111 of the radiation imaging panel 101 which was located on the radiation incident side. In addition, the dose of radiation detected increased and the signal/noise ratio deteriorated as the film thickness of the scintillator 112 of the radiation imaging panel 102 which detected radiation transmitted through the radiation imaging panel 101 increased. This leads to the same effective energy difference ΔE and material discrimination ability as those in the fourth example. In addition, the film thickness of the scintillator 111 was decreased to suppress the diffusion of light in the scintillator 111 and improve the MTF of the radiation imaging panel 101 as compared with the fourth example. Since the film thickness of the scintillator 111 was small, the effective energy difference was smaller than that in the fourth example, and the dose ratio improved.

Sixth Example

As the sixth example, a radiation detection apparatus 100 was manufactured, which had the same arrangement as that of the fourth and fifth examples except that a scintillator 111 had a film thickness of 100 μm, and a scintillator 112 had a film thickness of 600 μm.

Radiation images were respectively obtained by radiation imaging panels 101 and 102 by irradiating the manufactured radiation detection apparatus 100 with radiation under the same condition as that in the third and fourth comparative examples and the fourth and fifth examples.

When an MTF chart was placed on an Al sheet 601 of the radiation imaging panel 101 and MTFs at a spatial frequency of 2 lp/mm were measured, the MTF of the radiation imaging panel 101 was 0.390, and the MTF of the radiation imaging panel 102 was 0.370.

In the radiation detection apparatus 100 according to this example, the thickness of each member was calculated by the same method as that in the third comparative example. In the example, the calculated thickness of the 20-mm thick PMMA plate was 17.0 mm, the calculated thickness of the 6-mm thick Al plate was 5.4 mm, and the calculated thickness of the 2-mm thick Al plate was 1.6 mm.

In addition, in the radiation detection apparatus 100 according to this example, an effective energy difference ΔE between the radiation imaging panel 101 and the radiation imaging panel 102 was 13.4 keV and the dose ratio was 22.1%.

In this example, the dose of radiation reaching the radiation imaging panel 102 increased and the signal/noise ratio greatly improved as compared with the fourth example by decreasing the film thickness of the scintillator 111 of the radiation imaging panel 101 which was located on the radiation incident side more than in the fifth example. On the other hand, the material discrimination ability slightly deteriorated as compared with the fourth example. In addition, the film thickness of the scintillator 111 was decreased to suppress the diffusion of light in the scintillator 111 and improve the MTF of the radiation imaging panel 101 as compared with the fourth and fifth examples. Since the film thickness of the scintillator 111 was small, the average energy difference was smaller than that in the fourth and fifth examples, and the dose ratio improved.

Seventh Example

In the seventh example, a radiation detection apparatus 100 was manufactured, in which a radiation absorbing portion 103 differed from the radiation absorbing portion 103 used in the sixth example only in the base of the radiation absorbing portion 103.

The seventh example uses a 100-μm thick Cu plate as the base of the radiation absorbing portion, and a film formed from cerium oxide particles and a binder resin and having a film thickness of 500 μm and a filling factor of 50.0% is formed on the Cu plate by the same method as that in the fourth example.

Radiation images were respectively obtained by radiation imaging panels 101 and 102 by irradiating the manufactured radiation detection apparatus 100 with radiation under the same condition as that in the third and fourth comparative examples and the fourth to sixth examples.

When an MTF chart was placed on an Al sheet 601 of the radiation imaging panel 101 and MTFs at a spatial frequency of 2 lp/mm were measured, the MTF of the radiation imaging panel 101 was 0.390, and the MTF of the radiation imaging panel 102 was 0.370.

In the radiation detection apparatus 100 according to this example, the thickness of each member was calculated by the same method as that in the third comparative example. In the example, the calculated thickness of the 20-mm thick PMMA plate was 18.5 mm, the calculated thickness of the 6-mm thick Al plate was 5.8 mm, and the calculated thickness of the 2-mm thick Al plate was 1.8 mm.

An average energy difference ΔE and the dose ratio according to the seventh example were respectively 17.0 keV and 22.1%.

Figure 12:
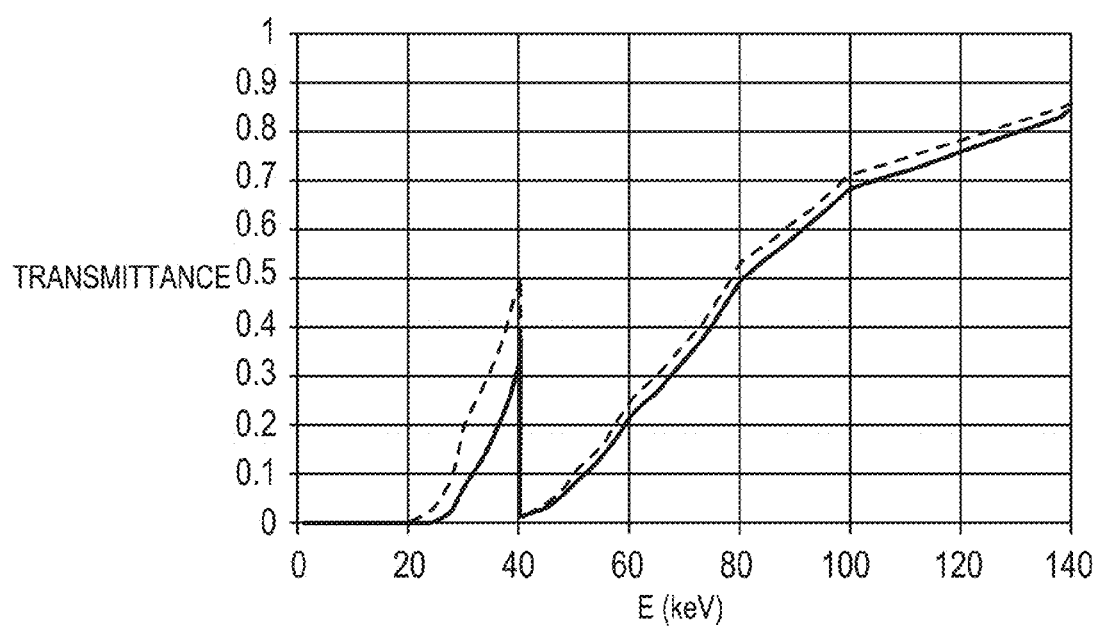
FIG. 12 is a graph showing the radiation transmittance of the radiation absorbing portion of the radiation detection apparatus according to the present invention.

FIG. 12 shows the transmittance of the radiation absorbing portion 103 (broken line) used in the fourth to sixth examples and the transmittance of the radiation absorbing portion 103 (solid line) used in the seventh example. It is obvious in the seventh example that since the substrate of a radiation absorbing portion 103 is changed to a 100-μm thick Cu plate, the transmittance at 40 keV or less significantly decreases with respect to the transmittance at 40 keV or more, and the energy separation performance has improved.

In addition, FIG. 13 shows the results obtained by plotting luminance ratios with respect to the effective energy differences ΔE in the third and fourth comparative examples and the fourth to seventh examples. It is obvious from FIG. 13 that as compared with the third and fourth comparative examples, the fourth to sixth examples obtained larger luminance ratios in more preferable directions, that is, ΔE, and the effects of the radiation absorbing portion 103 were able to be confirmed. In addition, the radiation absorbing portion 103 as a composite arrangement constituted by a layer containing lanthanoid compound particles and a metal plate exhibited superior characteristics as compared with the fourth to sixth examples.

In the radiation detection apparatus 100 for obtaining an energy subtraction image by one irradiation with radiation, the radiation absorbing portion 103 containing a lanthanoid element or compound is arranged between the two imaging panels to separate the high-energy components and the low-energy components of radiation. In addition, making the radiation absorbing portion 103 further include a metal plate as a non-lanthanoid member containing an element other than lanthanoid elements and compounds can further separate the high-energy components and the low-energy components of radiation. Obviously, this improved the material discrimination ability with respect to obtained energy subtraction images. In addition, it was found that the material discrimination ability improved by properly selecting the thicknesses of the scintillators for absorbing radiation and converting it into light. FIG. 14 shows the evaluation results obtained in the fourth to seventh examples and the third and fourth comparative examples.

Although the embodiments and the examples according to the present invention have been described above, it is obvious that the present invention is not limited to these embodiments and examples. The above embodiments and examples can be changed and combined as needed without departing from the scope of the present invention.

Figure 15:
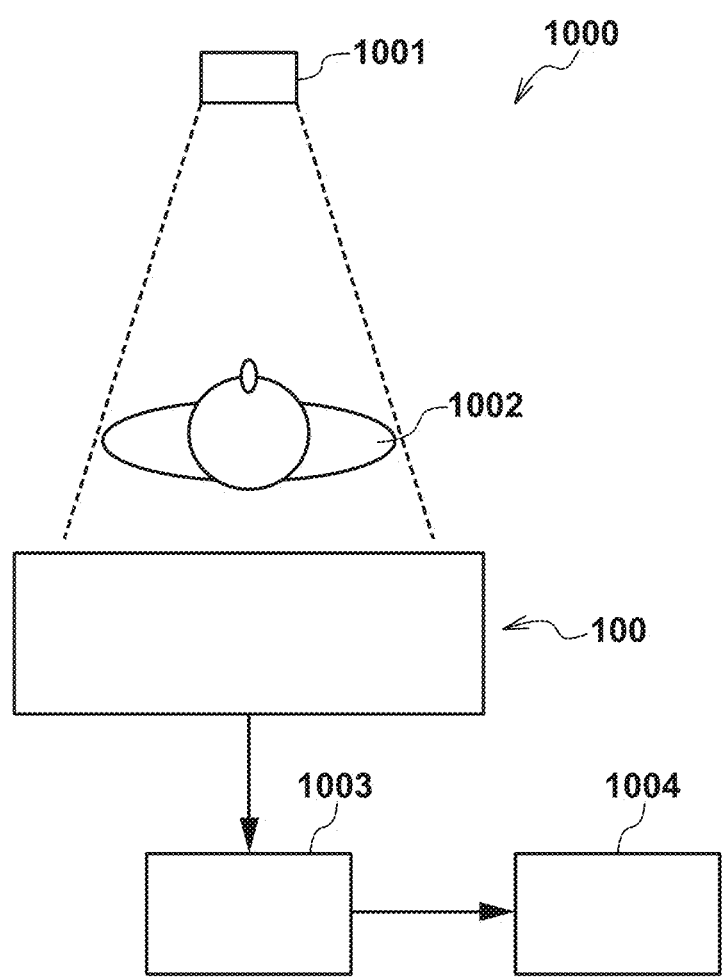
FIG. 15 is a view showing a radiation imaging system using the radiation detection apparatus according to the present invention.

A radiation imaging system 1000 incorporating the radiation detection apparatus 100 according to the present invention will be exemplarily described below with reference to FIG. 15. The radiation imaging system 1000 includes, for example, the radiation detection apparatus 100, a signal processing unit 1003 including an image processor, a display unit 1004 including a display, and a radiation source 1001 for generating radiation. Radiation (for example, X-rays) generated from the radiation source 1001 is transmitted through an object 1002. The radiation detection apparatus 100 according to this embodiment then detects radiation including internal information of the object 1002. For example, the signal processing unit 1003 performs predetermined signal processing by using a radiation image obtained by the above operation to generate image data. This image data is displayed on the display unit 1004.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-064395, filed Mar. 28, 2016 and No. 2016-212126 filed Oct. 28, 2016, which are hereby incorporated by reference wherein in their entirety.

What is claimed is:

1. A radiation detection apparatus comprising:
a housing;
a first radiation imaging panel and a second radiation imaging panel arranged to overlap each other in the housing; and
a radiation absorbing portion arranged between the first radiation imaging panel and the second radiation imaging panel,
wherein the radiation absorbing portion comprises:
a first member with energy at a K-absorption edge of 38 keV to 60 keV; and
a second member,
wherein the first member comprises a resin with added particles containing at least one element selected from the group consisting of lanthanum, cerium, praseodymium, neodymium, promethium, samarium, europium, gadolinium, terbium, dysprosium, holmium, erbium, and thulium, and
wherein the second member comprises a metal plate containing at least one element selected from the group consisting of copper, silver, zinc, and tin.

2. The apparatus according to claim 1, wherein the first member does not generate light detectable by the first radiation imaging panel and the second radiation imaging panel to the first radiation imaging panel and the second radiation imaging panel.

3. The apparatus according to claim 1, wherein the second member does not contain an element selected from the group consisting of lanthanum, cerium, praseodymium, neodymium, promethium, samarium, europium, gadolinium, terbium, dysprosium, holmium, erbium, and thulium.

4. The apparatus according to claim 1, wherein the first member does not convert radiation into visible light.

5. The apparatus according to claim 1, wherein the first member has a thickness of 100 μm to 1,000 μm.

6. The apparatus according to claim 1, wherein the first radiation imaging panel and the second radiation imaging panel each comprise a scintillator and a detection unit configured to detect light converted from radiation by the scintillator,
wherein at least one of the first radiation imaging panel and the second radiation imaging panel further comprises a member for ensuring a reflectance of the scintillator, and
wherein the second member is arranged separately from the member for ensuring the reflectance.

7. The apparatus according to claim 6, wherein detection units included in the first radiation imaging panel and the second radiation imaging panel are arranged adjacent to each other through the radiation absorbing portion.

8. The apparatus according to claim 6, wherein the first radiation imaging panel is arranged to be closer to a radiation incident side than the second radiation imaging panel,
wherein the scintillator of the first radiation imaging panel is a first scintillator,
wherein the scintillator of the second radiation imaging panel is a second scintillator, and
wherein a radiation absorptance of the first scintillator is not more than a radiation absorptance of the second scintillator.

9. The apparatus according to claim 8, wherein the first scintillator contains thallium activated cesium iodide (CsI:Tl)
wherein the first scintillator has a columnar crystal structure grown from an interface between the detection unit arranged on the first radiation imaging panel and the first scintillator in a direction intersecting with the interface, and
wherein the first scintillator, in an orthogonal projection with respect to the interface, if a filling factor is a ratio of an area of a columnar crystal of the first scintillator to an area of the columnar crystal of the first scintillator and a gap between columnar crystals, satisfies:
a film thickness [μm] of the first scintillator × the filling factor [%] ≤8000 [μm·%].

10. The apparatus according to claim 1, wherein the radiation absorbing portion further comprises a light-shielding member configured to shield visible light, and
wherein the light-shielding member is arranged at least between the first radiation imaging panel and the radiation absorbing portion or between the second radiation imaging panel and the radiation absorbing portion.

11. A radiation imaging system comprising:
the radiation detection apparatus according to claim 1; and
a signal processing unit configured to process a signal from the radiation detection apparatus.

12. The apparatus according to claim 1, wherein the radiation absorbing portion is a composite layer including the resin of the first member and the metal plate of the second member.

13. A radiation detection apparatus comprising:
a housing;
a first radiation imaging panel and a second radiation imaging panel arranged to overlap each other in the housing; and
a radiation absorbing portion arranged between the first radiation imaging panel and the second radiation imaging panel,
wherein the radiation absorbing portion comprises:
a first member containing an element with energy at a K-absorption edge of 38 keV to 60 keV; and
a second member containing an element other than the element in the first member,
wherein the first member contains a resin with added particles containing a lanthanoid compound that includes at least one element selected from the group consisting of lanthanum, cerium, praseodymium, neodymium, promethium, samarium, europium, gadolinium, terbium, dysprosium, holmium, erbium, and thulium, and
wherein the second member comprises a metal plate containing at least one element selected from the group consisting of copper, silver, zinc, and tin.

14. The apparatus according to claim 13, wherein the second member does not contain an element selected from the group consisting of lanthanum, cerium, praseodymium, neodymium, promethium, samarium, europium, gadolinium, terbium, dysprosium, holmium, erbium, and thulium.

15. The apparatus according to claim 13, wherein the first member does not convert radiation into visible light.

16. The apparatus according to claim 13, wherein the first member has a thickness of 100 µm to 1,000 µm.

17. The apparatus according to claim 13, wherein the first radiation imaging panel and the second radiation imaging panel each comprise a scintillator and a detection unit configured to detect light converted from radiation by the scintillator,
wherein at least one of the first radiation imaging panel and the second radiation imaging panel further comprises a member for ensuring a reflectance of the scintillator, and
wherein the second member is arranged separately from the member for ensuring the reflectance.

18. The apparatus according to claim 17, wherein detection units included in the first radiation imaging panel and the second radiation imaging panel are arranged adjacent to each other through the radiation absorbing portion.

19. The apparatus according to claim 17, wherein the first radiation imaging panel is arranged to be closer to a radiation incident side than the second radiation imaging panel,
wherein the scintillator of the first radiation imaging panel is a first scintillator,
wherein the scintillator of the second radiation imaging panel is a second scintillator, and
wherein a radiation absorptance of the first scintillator is not more than a radiation absorptance of the second scintillator.

20. The apparatus according to claim 19, wherein the first scintillator contains thallium activated cesium iodide (CsI:Tl),
wherein the first scintillator has a columnar crystal structure grown from an interface between the detection unit arranged on the first radiation imaging panel and the first scintillator in a direction intersecting with the interface, and
wherein the first scintillator, in an orthogonal projection with respect to the interface, if a filling factor is a ratio of an area of a columnar crystal of the first scintillator to an area of the columnar crystal of the first scintillator and a gap between columnar crystals, satisfies:
a film thickness [µm] of the first scintillator × the filling factor [%] ≤8000 [µm·%].

21. The apparatus according to claim 13, wherein the radiation absorbing portion further comprises a light-shielding member configured to shield visible light, and
wherein the light-shielding member is arranged at least between the first radiation imaging panel and the radiation absorbing portion or between the second radiation imaging panel and the radiation absorbing portion.

22. A radiation imaging system comprising:
the radiation detection apparatus according to claim 13; and
a signal processing unit configured to process a signal from the radiation detection apparatus.

23. The apparatus according to claim 13, wherein the radiation absorbing portion is a composite layer including the resin of the first member and the metal plate of the second member.

24. A radiation detection apparatus comprising:
a housing;
a first radiation imaging panel and a second radiation imaging panel arranged to overlap each other in the housing; and
a radiation absorbing portion arranged between the first radiation imaging panel and the second radiation imaging panel,
wherein the radiation absorbing portion comprises a first member and a second member,
wherein the first member comprises:
a resin; and
particles containing at least one element selected from the group consisting of lanthanum, cerium, praseodymium, neodymium, promethium, samarium, europium, gadolinium, terbium, dysprosium, holmium, erbium, and thulium, and
wherein the second member comprises a metal plate containing at least one element selected from the group consisting of copper, silver, zinc, and tin.

25. The apparatus according to claim 24, wherein the second member does not contain an element selected from the group consisting of lanthanum, cerium, praseodymium, neodymium, promethium, samarium, europium, gadolinium, terbium, dysprosium, holmium, erbium, and thulium.

26. The apparatus according to claim 24, wherein the first member does not generate light detectable by the first radiation imaging panel and the second radiation imaging panel to the first radiation imaging panel and the second radiation imaging panel.

27. The apparatus according to claim 24, wherein the first member does not convert radiation into visible light.

28. The apparatus according to claim 24, wherein the first member has a thickness of 100 µm to 1,000 µm.

29. The apparatus according to claim 24, wherein the first radiation imaging panel and the second radiation imaging panel each comprise a scintillator and a detection unit configured to detect light converted from radiation by the scintillator, wherein at least one of the first radiation imaging panel and the second radiation imaging panel further comprises a member for ensuring a reflectance of the scintillator, and wherein the second member is arranged separately from the member for ensuring the reflectance.

30. The apparatus according to claim 29, wherein detection units included in the first radiation imaging panel and the second radiation imaging panel are arranged adjacent to each other through the radiation absorbing portion.

31. The apparatus according to claim 29, wherein the first radiation imaging panel is arranged to be closer to a radiation incident side than the second radiation imaging panel, wherein the scintillator of the first radiation imaging panel is a first scintillator, wherein the scintillator of the second radiation imaging panel is a second scintillator, and wherein a radiation absorptance of the first scintillator is not more than a radiation absorptance of the second scintillator.

32. The apparatus according to claim 31, wherein the first scintillator contains thallium activated cesium iodide (CsI: Tl), wherein the first scintillator has a columnar crystal structure grown from an interface between the detection unit arranged on the first radiation imaging panel and the first scintillator in a direction intersecting with the interface, and wherein the first scintillator, in an orthogonal projection with respect to the interface, if a filling factor is a ratio of an area of a columnar crystal of the first scintillator to an area of the columnar crystal of the first scintillator and a gap between columnar crystals, satisfies:

a film thickness [μm] of the first scintillator × the filling factor [%] ≤8000 [μm·%].

33. The apparatus according to claim 24, wherein the radiation absorbing portion further comprises a light-shielding member configured to shield visible light, and wherein the light-shielding member is arranged at least between the first radiation imaging panel and the radiation absorbing portion or between the second radiation imaging panel and the radiation absorbing portion.

34. A radiation imaging system comprising:

the radiation detection apparatus according to claim 24; and a signal processing unit configured to process a signal from the radiation detection apparatus.

* * * * *